US011729406B2

United States Patent
Habibian et al.

(10) Patent No.: US 11,729,406 B2
(45) Date of Patent: Aug. 15, 2023

(54) VIDEO COMPRESSION USING DEEP GENERATIVE MODELS

(71) Applicant: QUALCOMM Incorporated, San Diego, CA (US)

(72) Inventors: Amirhossein Habibian, Amsterdam (NL); Ties Jehan Van Rozendaal, Amsterdam (NL); Taco Sebastiaan Cohen, Amsterdam (NL)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/826,221

(22) Filed: Mar. 21, 2020

(65) Prior Publication Data

US 2020/0304802 A1    Sep. 24, 2020

Related U.S. Application Data

(60) Provisional application No. 62/821,778, filed on Mar. 21, 2019.

(51) Int. Cl.
*H04N 19/14* (2014.01)
*H04N 19/124* (2014.01)
(Continued)

(52) U.S. Cl.
CPC ............. *H04N 19/20* (2014.11); *G06F 18/21* (2023.01); *G06N 3/044* (2023.01); *G06N 3/045* (2023.01);
(Continued)

(58) Field of Classification Search
CPC .... H04N 19/14; H04N 19/124; H04N 19/179; H04N 19/186; H04N 19/46; H04N 5/247;
(Continued)

(56) References Cited

U.S. PATENT DOCUMENTS

| 6,925,208 B1 * | 8/2005 | Huffman ................ H04N 19/64 382/233 |
| 10,623,775 B1 * | 4/2020 | Theis .................. G06N 3/0454 |

(Continued)

FOREIGN PATENT DOCUMENTS

| EP | 3624452 A1 | 3/2020 |
| WO | 2019009489 A1 | 1/2019 |

OTHER PUBLICATIONS

Dandan D., et al., "Deep Neural Network Based Frame Reconstruction for Optimized Video Coding", Jun. 21, 2018 (Jun. 21, 2018), Robocup 2008, Robocup 2008: Robot Soccer World Cup XII; [Lecture Notes In Computer Science;Lect. Notes Computer], Springer International Publishing, Cham, pp. 235-242, XP047494584, ISBN: 978-3-319-10403-4, [retrieved on Jun. 21, 2018], abstract, section 3.
(Continued)

*Primary Examiner* — Mohammad J Rahman
(74) *Attorney, Agent, or Firm* — Patterson + Sheridan, LLP

(57) ABSTRACT

Certain aspects of the present disclosure are directed to methods and apparatus for compressing video content using deep generative models. One example method generally includes receiving video content for compression. The received video content is generally encoded into a latent code space through an encoder, which may be implemented by a first artificial neural network. A compressed version of the encoded video content is generally generated through a trained probabilistic model, which may be implemented by a second artificial neural network, and output for transmission.

30 Claims, 12 Drawing Sheets

(51) Int. Cl.

| | |
|---|---|
| *H04N 19/179* | (2014.01) |
| *H04N 19/186* | (2014.01) |
| *H04N 19/46* | (2014.01) |
| *H04N 5/247* | (2006.01) |
| *G06K 9/00* | (2022.01) |
| *G06K 9/62* | (2022.01) |
| *G06N 3/04* | (2023.01) |
| *G06N 3/08* | (2023.01) |
| *H04N 19/20* | (2014.01) |
| *G06N 3/084* | (2023.01) |
| *G06V 20/40* | (2022.01) |
| *G06F 18/21* | (2023.01) |
| *G06N 3/044* | (2023.01) |
| *G06N 3/045* | (2023.01) |
| *G06N 3/047* | (2023.01) |
| *H04N 23/90* | (2023.01) |
| *G06V 10/764* | (2022.01) |
| *G06V 10/82* | (2022.01) |

(52) U.S. Cl.
CPC ............ *G06N 3/047* (2023.01); *G06N 3/084* (2013.01); *G06V 10/764* (2022.01); *G06V 10/82* (2022.01); *G06V 20/46* (2022.01); *H04N 19/124* (2014.11); *H04N 19/14* (2014.11); *H04N 19/179* (2014.11); *H04N 19/186* (2014.11); *H04N 19/46* (2014.11); *H04N 23/90* (2023.01)

(58) Field of Classification Search
CPC ............ G06K 9/00744; G06K 9/6217; G06N 3/0445; G06N 3/0454; G06N 3/084
USPC ........................................................ 348/143
See application file for complete search history.

(56) References Cited

U.S. PATENT DOCUMENTS

| | | | | |
|---|---|---|---|---|
| 10,678,849 | B1* | 6/2020 | Ouimet | G06N 3/08 |
| 2004/0045030 | A1* | 3/2004 | Reynolds | H04N 21/23406 725/110 |
| 2008/0285871 | A1* | 11/2008 | Ishikawa | H04N 19/85 382/246 |
| 2014/0244592 | A1* | 8/2014 | Mande | G06F 16/113 707/661 |
| 2015/0154971 | A1* | 6/2015 | Boehm | G10L 19/0212 704/500 |
| 2018/0074493 | A1 | 3/2018 | Prokhorov et al. | |
| 2018/0199066 | A1 | 7/2018 | Ross | |
| 2018/0218256 | A1 | 8/2018 | Raviv et al. | |
| 2018/0223641 | A1* | 8/2018 | Ciezobka | G01N 27/72 |
| 2018/0247193 | A1* | 8/2018 | Holtham | G06N 3/0454 |
| 2018/0268571 | A1 | 9/2018 | Park et al. | |
| 2018/0276814 | A1* | 9/2018 | Frangioni | G06T 7/90 |
| 2018/0376181 | A1* | 12/2018 | Koninckx | H04N 13/167 |
| 2019/0080483 | A1* | 3/2019 | Mammou | H04N 19/593 |
| 2020/0027247 | A1* | 1/2020 | Minnen | G06N 3/0454 |
| 2020/0116627 | A1* | 4/2020 | Kessler | G01J 3/027 |
| 2020/0118423 | A1* | 4/2020 | Moura | G08G 1/0116 |
| 2020/0134463 | A1* | 4/2020 | Haidar | G06N 3/048 |
| 2020/0151580 | A1* | 5/2020 | Horesh | G06N 3/0481 |
| 2020/0218982 | A1* | 7/2020 | Annau | G06N 20/00 |
| 2020/0304804 | A1 | 9/2020 | Habibian et al. | |
| 2020/0349374 | A1* | 11/2020 | Morzhakov | G06K 9/6273 |
| 2020/0389672 | A1* | 12/2020 | Kennett | G06N 20/00 |
| 2022/0036915 | A1* | 2/2022 | Koretzky | G06F 18/214 |

OTHER PUBLICATIONS

International Search Report and Written Opinion—PCT/US2020/024233—ISA/EPO—dated Jun. 22, 2020.

Minnen D., et al., "Joint Autoregressive and Hierarchical Priors for Learned Image Compression", arxiv.org, Cornell University Library, 201 Olin Library Cornell University Ithaca, NY 14853, Sep. 8, 2018 (Sep. 8, 2018), XP081188741, 22 pages, abstract, figure 1, figures 17, 18, 19, 21, sections 1 and 2, section 4.

* cited by examiner

VIDEO COMPRESSION USING DEEP GENERATIVE MODELS

CROSS-REFERENCE TO RELATED APPLICATIONS

This application claims benefit of U.S. Provisional Patent Application Ser. No. 62/821,778, entitled "Video Compression Using Deep Generative Models", filed Mar. 21, 2019, and assigned to the assignee hereof, the contents of which are hereby incorporated by reference in its entirety.

FIELD OF THE DISCLOSURE

The present disclosure generally relates to artificial neural networks and, more particularly, to using artificial neural networks to compress video content.

DESCRIPTION OF RELATED ART

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots.

Individual nodes in the artificial neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation." The weight values may initially be determined by an iterative flow of training data through the network (e.g., weight values are established during a training phase in which the network learns how to identify particular classes by their typical input data characteristics).

Different types of artificial neural networks exist, such as recurrent neural networks (RNNs), multilayer perceptron (MLP) neural networks, convolutional neural networks (CNNs), and the like. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. Convolutional neural networks may include collections of artificial neurons that each have a receptive field (e.g., a spatially localized region of an input space) and that collectively tile an input space. Convolutional neural networks have numerous applications. In particular, CNNs have broadly been used in the area of pattern recognition and classification.

In layered neural network architectures, the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

SUMMARY

Certain aspects of the present disclosure are directed to a method for compressing video. The method generally includes receiving video content for compression, encoding the received video content into a latent code space through an encoder implemented by a first artificial neural network, the encoding being based, at least in part, on information about the received video content, generating a compressed version of the encoded video content through a probabilistic model implemented by a second artificial neural network, and outputting the compressed version of the encoded video content for transmission.

Certain aspects of the present disclosure are directed to a system for compressing video. The system includes at least one processor and a memory coupled to the at least one processor. The at least one processor is generally configured to receive video content for compression, encode the received video content into a latent code space through an encoder implemented by a first artificial neural network, the encoding being based, at least in part, on information about the received video content, generate a compressed version of the encoded video content through a probabilistic model implemented by a second artificial neural network, and output the compressed version of the encoded video content for transmission.

Certain aspects of the present disclosure are directed to a method for decompressing video. The method generally includes receiving a compressed version of an encoded video content, the encoded video content having been encoded based, at least in part, on information about source video content, decompressing the compressed version of the encoded video content into a code in a latent code space through a probabilistic model implemented by a first artificial neural network, decompressing the code in the latent code space into a reconstruction of the encoded video content through a decoder implemented by a second artificial neural network, and outputting the reconstruction of the encoded video content.

Certain aspects of the present disclosure are directed to a system for decompressing video. The system includes at least one processor and a memory coupled to the at least one processor. The processor is generally configured to receive a compressed version of an encoded video content, the encoded video content having been encoded based, at least in part, on information about source video content, decompress the compressed version of the encoded video content into a code in a latent code space through a probabilistic model implemented by a first artificial neural network, decompress the code in the latent code space into a reconstruction of the encoded video content through a decoder implemented by a second artificial neural network, and output the reconstruction of the encoded video content.

Certain aspects of the present disclosure are directed to a method for compressing video. The method generally includes receiving video content for compression, encoding the received video content into a latent code space through an encoder implemented by a first artificial neural network and a content mask identifying an amount of lossy compression to use in compressing different areas of the received video content, generating a compressed version of the encoded video content through a probabilistic model implemented by a second artificial neural network, and outputting the compressed version of the encoded video content for transmission.

Certain aspects of the present disclosure are directed to a system for compressing video. The system includes at least one processor and a memory coupled to the at least one processor. The at least one processor is generally configured to receive video content for compression, encode the received video content into a latent code space through an encoder implemented by a first artificial neural network and a content mask identifying an amount of lossy compression to use in compressing different areas of the received video content, generate a compressed version of the encoded video content through a probabilistic model implemented by a second artificial neural network, and output the compressed version of the encoded video content for transmission.

Certain aspects of the present disclosure are directed to a non-transitory computer-readable medium comprising instructions that, when executed by at least one processor, cause the processor to perform operations for compressing video. The operations generally include receiving video content for compression, encoding the received video content into a latent code space through an encoder implemented by a first artificial neural network and a content mask identifying an amount of lossy compression to use in compressing different areas of the received video content, generating a compressed version of the encoded video content through a probabilistic model implemented by a second artificial neural network, and outputting the compressed version of the encoded video content for transmission.

Certain aspects of the present disclosure are directed to a method for compressing video. The method generally includes receiving video content for compression, encoding the received video content into a latent code space through an encoder implemented by a first artificial neural network trained against data from a fixed ambient scene from which the video content was captured, generating a compressed version of the encoded video content through a probabilistic model implemented by a second artificial neural network, and outputting the compressed version of the encoded video content for transmission.

Certain aspects of the present disclosure are directed to a system for compressing video. The system includes at least one processor and a memory coupled to the at least one processor. The at least one processor is generally configured to receive video content for compression, encode the received video content into a latent code space through an encoder implemented by a first artificial neural network trained against data from a fixed ambient scene from which the video content was captured, generate a compressed version of the encoded video content through a probabilistic model implemented by a second artificial neural network, and output the compressed version of the encoded video content for transmission.

Certain aspects of the present disclosure are directed to a non-transitory computer-readable medium comprising instructions that, when executed by at least one processor, cause the processor to perform operations for compressing video. The operations generally include receiving video content for compression, encoding the received video content into a latent code space through an encoder implemented by a first artificial neural network trained against data from a fixed ambient scene from which the video content was captured, generating a compressed version of the encoded video content through a probabilistic model implemented by a second artificial neural network, and outputting the compressed version of the encoded video content for transmission.

Certain aspects of the present disclosure are directed to a method for compressing video. The method generally includes receiving video content having a plurality of channels for compression, the plurality of channels comprising one or more additional data channels in addition to one or more luminance channels in video content captured by a first camera; encoding the received video content into a latent code space through an encoder implemented by a first artificial neural network, the encoding being based on correlations between modalities in the plurality of data channels; generating a compressed version of the encoded video content through a probabilistic model implemented by a second artificial neural network; and outputting the compressed version of the encoded video content for transmission.

Certain aspects of the present disclosure are directed to a system for compressing video. The system includes at least one processor and a memory coupled to the at least one processor. The at least one processor is generally configured to receive video content having a plurality of channels for compression, the plurality of channels comprising one or more additional data channels in addition to one or more luminance channels in video content captured by a first camera; encode the received video content into a latent code space through an encoder implemented by a first artificial neural network, the encoding being based on correlations between modalities in the plurality of data channels; generate a compressed version of the encoded video content through a probabilistic model implemented by a second artificial neural network; and output the compressed version of the encoded video content for transmission.

Certain aspects of the present disclosure are directed to a non-transitory computer-readable medium comprising instructions that, when executed by at least one processor, cause the processor to perform operations for compressing video. The operations generally include receiving video content having a plurality of channels for compression, the plurality of channels comprising one or more additional data channels in addition to one or more luminance channels in video content captured by a first camera; encoding the received video content into a latent code space through an encoder implemented by a first artificial neural network, the encoding being based on correlations between modalities in the plurality of data channels; generating a compressed version of the encoded video content through a probabilistic model implemented by a second artificial neural network; and outputting the compressed version of the encoded video content for transmission.

Other aspects, advantages, and features of the present disclosure will become apparent after review of the entire application, including the following sections: Brief Description of the Drawings, Detailed Description, and the Claims.

DETAILED DESCRIPTION

Certain aspects of the present disclosure provide methods and apparatus for compressing video content using deep generative models and for decompressing received bitstreams into video content.

With reference now to the Figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Example System-On-a-Chip for Deep Neural Networks and Deep Learning

Figure 1:
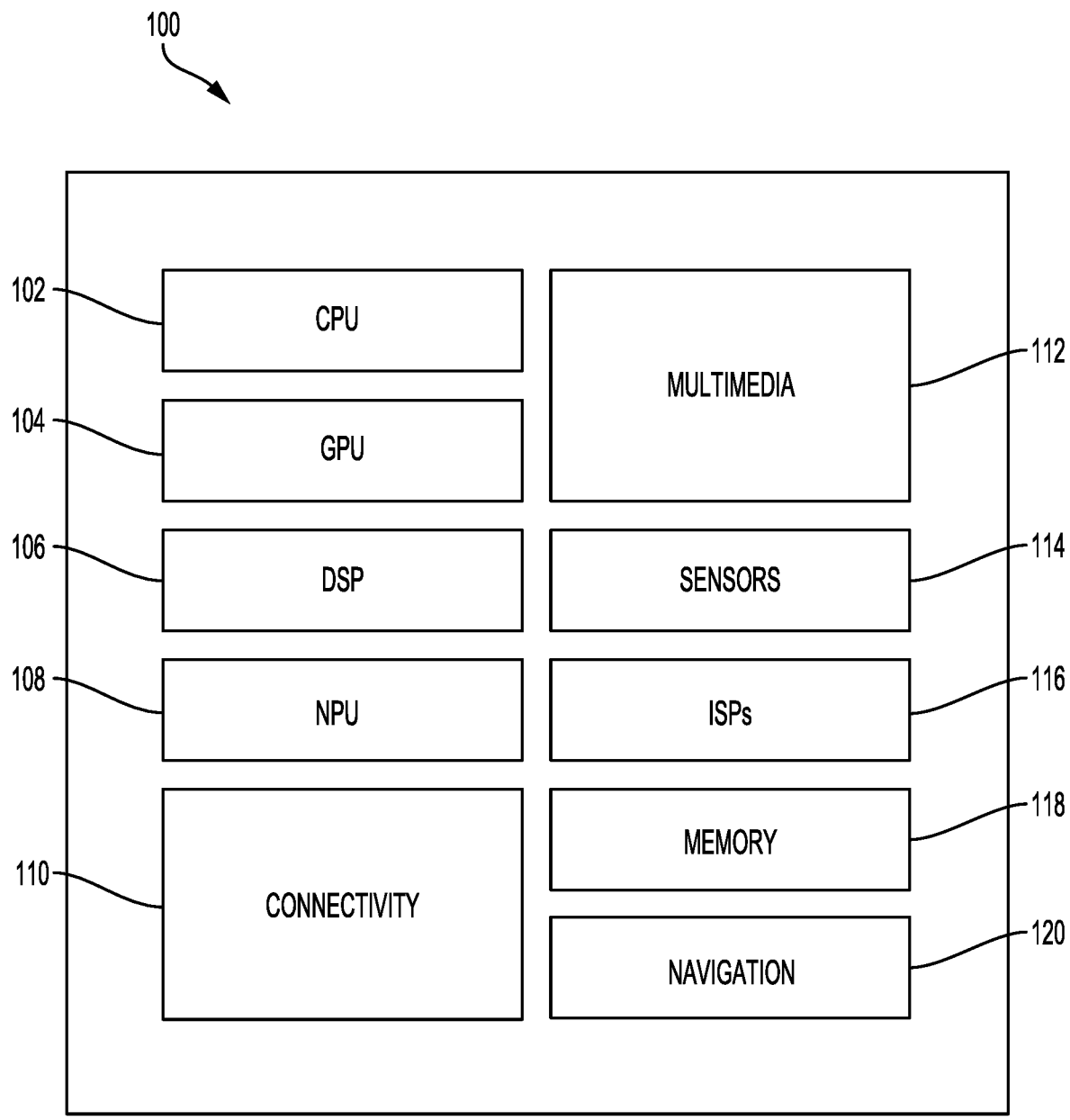
FIG. 1 illustrates an example implementation of a system-on-a-chip (SOC).

FIG. 1 illustrates an example implementation of a system-on-a-chip (SOC) 100, which may include a central processing unit (CPU) 102 or a multi-core CPU configured to perform a parallel Monte Carlo dropout function, in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform video compression and/or decompression according to aspects of the present disclosure discussed below. By using deep learning architectures to perform video compression and/or decompression, aspects of the present disclosure may accelerate the compression of video content on a device and transmission of the compressed video to another device and/or may accelerate the decompression of compressed video content received at the device.

Deep Neural Networks and Deep Learning

Deep learning architectures may perform complex tasks, such as object recognition, by learning to represent inputs at successively higher levels of abstraction in each layer, thereby building up a useful feature representation of the input data. In this way, deep learning addresses a major bottleneck of traditional machine learning.

Prior to the advent of deep learning, a machine learning approach to an object recognition problem may have relied heavily on human engineered features, perhaps in combination with a shallow classifier. A shallow classifier may be a two-class linear classifier, for example, in which a weighted sum of input values (e.g., input vector components) may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

In some implementations, a deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. Further layers may learn to represent complex shapes in visual data or words in auditory data. Still further layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
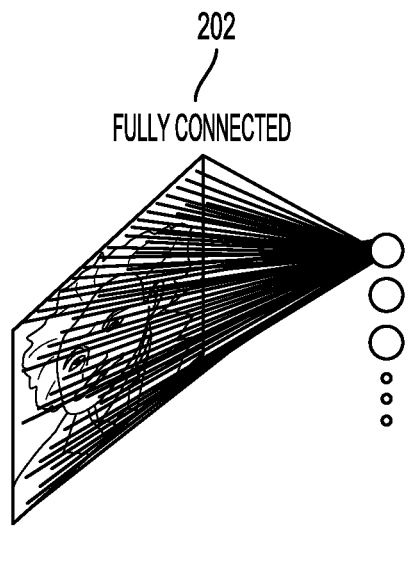
FIG. 2A illustrates an example of a fully connected neural network.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer.

Figure 2B:
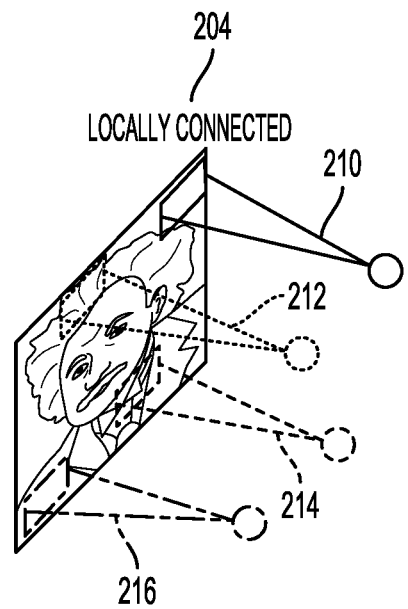
FIG. 2B illustrates an example of a locally connected neural network.

FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
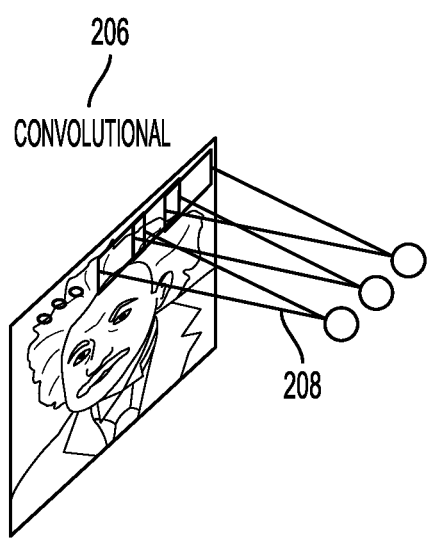
FIG. 2C illustrates an example of a convolutional neural network.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map receiving input from a range of neurons in the previous layer and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

One type of convolutional neural network is a deep convolutional network (DCN). Deep convolutional networks (DCNs) are networks of convolutional layers, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

Figure 2D:
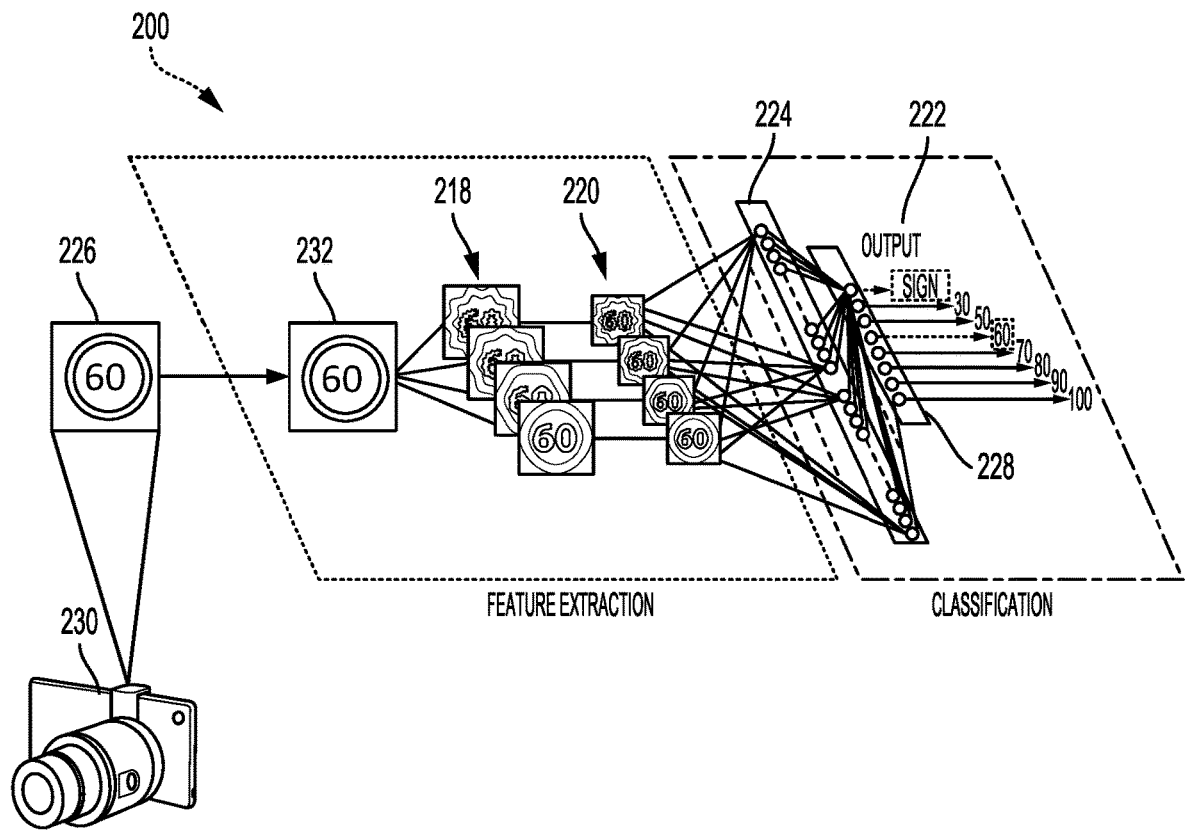
FIG. 2D illustrates a detailed example of a deep convolutional network (DCN) designed to recognize visual features from an image.

FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights. These are just some example tasks, and many others are possible.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Finally, deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Figure 3:
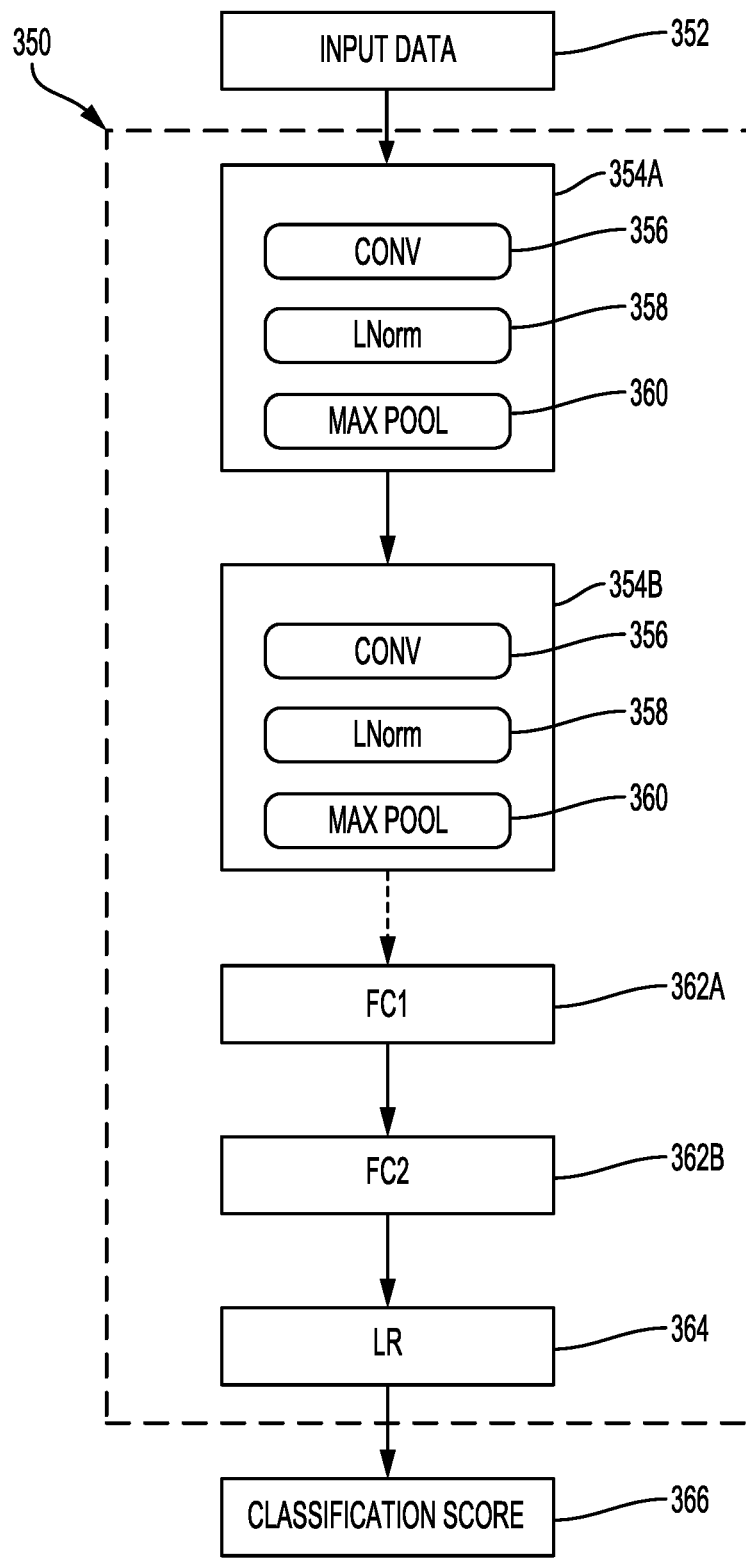
FIG. 3 is a block diagram illustrating a deep convolutional network (DCN).

FIG. 3 is a block diagram illustrating an exemplary deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data 352 to generate a feature map. Although only two convolution blocks 354A, 354B are shown, the present disclosure is not so limiting, and instead, any number of convolution blocks (e.g., blocks 354A, 354B) may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers, such as layer 362A (labeled "FC1") and layer 362B (labeled "FC2"). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Example Video Compression Using Deep Generative Models

Video content may be uploaded to video hosting services and sharing platforms and may be transmitted to a variety of devices. Recording uncompressed video content generally results in large file sizes that greatly increase as the resolution of the recorded video content increases. For example, uncompressed 16-bit per channel video recorded in three channels (e.g., red, green, and blue channels in RGB color spaces, luminance and chroma difference channels in composite color spaces (e.g., YCbCr), etc.) and 1080p/24 (e.g. a resolution of 1920 pixels in width and 1080 pixels in height, with 24 frames per second captured) may occupy 12.4 megabytes per frame, or 297.6 megabytes per second. Uncompressed 16-bit per channel video recorded in three channels and in 4K resolution at 24 frames per second may occupy 49.8 megabytes per frame, or 1195.2 megabytes per second.

Because uncompressed video content may result in large files that may involve sizable memory for physical storage and considerable bandwidth for transmission, techniques may be utilized to compress such video content. For example, consider the delivery of video content over wireless networks. It is projected that video content will comprise the majority of consumer internet traffic, with over half of that video content being delivered to mobile devices over wireless networks (e.g., via LTE, LTE-Advanced, New Radio (NR), or other wireless networks). Despite advances in the amount of available bandwidth in wireless networks, it may still be desirable to reduce the amount of bandwidth used to deliver video content in these networks.

To reduce the size of video content—and thus the amount of storage involved to store video content—and the amount of bandwidth involved in delivering video content, various compression algorithms may be applied to video content. Conventionally, video content may be compressed using a priori defined compression algorithms, such as the Motion Picture Experts Group (MPEG) algorithms, H.264, or the High Efficiency Video Coding algorithm. These a priori defined compression algorithms may be able to retain the majority of the information in raw video content and may be defined a priori based on signal processing and information theory ideas. However, while these predefined compression algorithms may be applicable generally (e.g., to any type of video content), these predefined compression algorithms may not take into account similarities in content, new resolutions or frame rates for video capture and delivery, non-natural imagery (e.g., radar imagery or other imagery captured via various sensors), and the like.

Aspects of the present disclosure provide for the compression and decompression of video content using a deep neural network. The deep neural network may include: (1) an encoder, trained using an autoencoder, that maps frames of received video content into a latent code space, (2) a decoder, trained using the autoencoder, that decodes a code in the latent code space to an approximation of the video content mapped to the code by the encoder and (3) a probabilistic model that can losslessly compress codes from the latent code space. The encoder and decoder may be deployed on different devices (e.g., the encoder on a transmitting device, and the decoder on a receiving device) so that a transmitting device can transmit compressed video and a receiving device can decompress the received compressed video for output (e.g., to a display). The latent code space generally refers to a space including codes Z that are compressed representations of video content. The latent code space may be a layer in a deep neural network having the smallest number of neurons, and each code Z may be associated with a specific neuron in the latent code space layer. The probabilistic model generally generates a probability distribution over a set of codes Z that can represent an encoded video based on the encoded video content. The deep neural network may also include an arithmetic coder that generates a bitstream to be output for transmission based on the probability distribution and the set of codes Z. By compressing (and decompressing) video content using one or more artificial neural networks, aspects of the present disclosure may provide for video encoding and encoding mechanisms that may be adaptable to various use cases by retraining the artificial neural network(s). Further, aspects of the present disclosure may provide for the autonomous generation of video encoders and decoders that generate compressed video content having video bitrate and/or quality approaching or exceeding that of conventional, a priori defined video compression algorithms (e.g., MPEG-4).

Figure 4A:
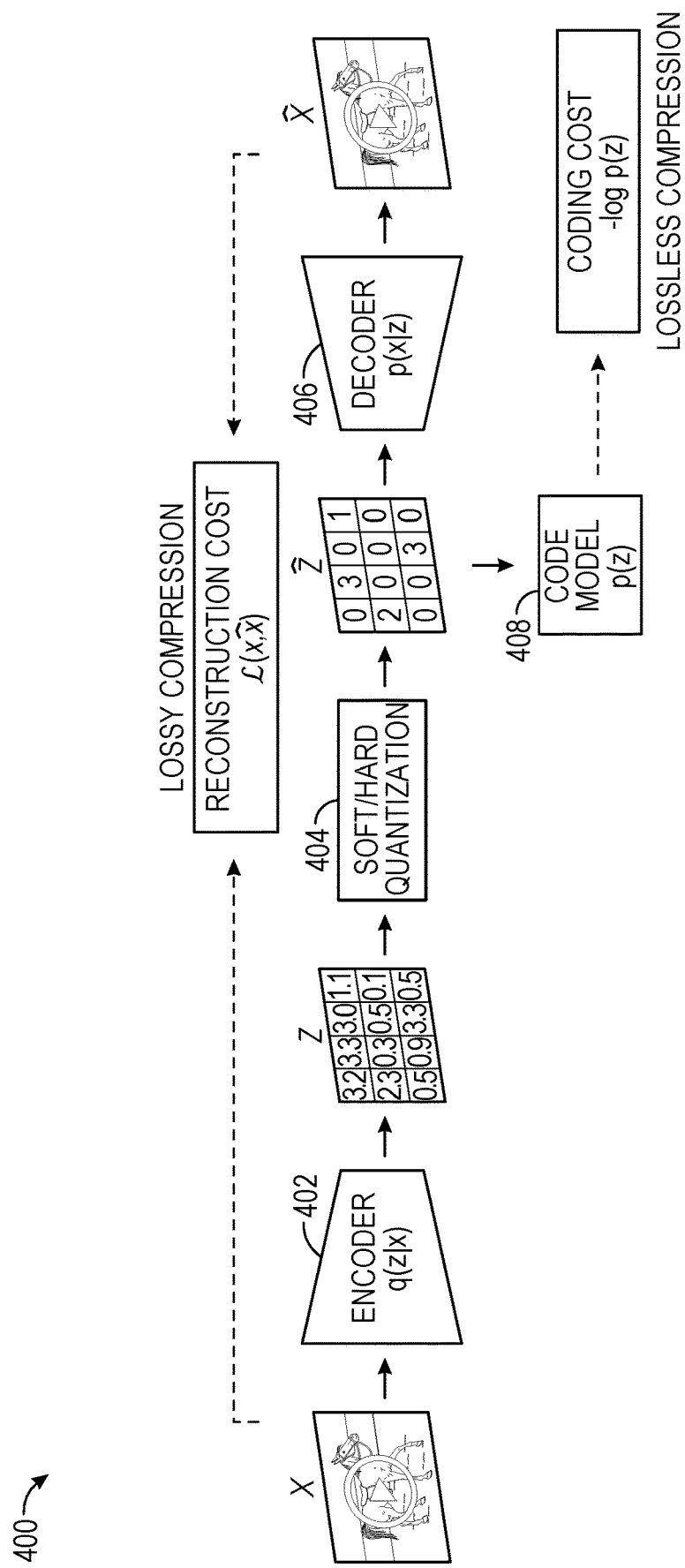
FIG. 4A illustrates an example pipeline for training an encoder and a decoder implemented as artificial neural networks using an autoencoder, according to aspects of the present disclosure.

FIG. 4A illustrates an example autoencoder 400 that trains neural networks to compress and decompress video content. Autoencoder 400 may thus train the encoder 462 of transmitting device 460 and the decoder 472 of receiving device 470 illustrated in FIG. 4B. As illustrated, a video x is provided as input into an encoder q(z|x) 402 to generate a code z in latent code space representative of video x. q(z|x) may represent an approximate posterior probability. The generated code z may be processed, using soft/hard quantization layer 404, to generate a code $\hat{z}$. Soft/hard quantization layer 404 may generate code $\hat{z}$, for example, by discretizing the coordinates of the latent code (e.g., code z in the latent code space) using a learned codebook. The learned codebook may include a number L of centers, $C=\{c_1 \ldots c_L\}$, where $\forall_i c_i \in \mathbb{R}$.

To train an encoder, autoencoder 400 may take a first training video (designated x) and map the first training video to a code z in a latent code space. As discussed, the encoder 402 may be implemented as a three-dimensional convolutional network such that the latent code space has at each (x, y, t) position a vector describing a block of video centered at that position. Each block may be set to an a priori defined horizontal and vertical size over a number of frames. The x coordinate may represent a horizontal pixel location in the block of video, the y coordinate may represent a vertical pixel location in the block of video, and the t position may represent a timestamp in the block of video. By using the three dimensions of horizontal pixel location, vertical pixel location, and time, the vector may describe an image patch across a plurality of frames. In some aspects, however, encoder 402 may map frames of a video in a two-dimensional space using a two-dimensional convolutional network. A code model used in mapping frames of a video in a two-dimensional space may make use of redundancy between adjacent frames (e.g., same or similar information included in successive frames).

Encoder 402 may be refined using a decoder 406 that decompresses code z to obtain a reconstruction $\hat{x}$ of the first training video. Generally the reconstruction $\hat{x}$ may be an approximation of the uncompressed first training video and need not be an exact copy of the first training video x. Encoder 402 may compare x and $\hat{x}$ to determine a distance vector or other difference value between the first training video and the reconstructed first training video. Based on the determined distance vector or other difference value, encoder 402 may adjust mappings between received video content (e.g., on a per-frame basis) and the latent code space to reduce the distance between an input uncompressed video and an encoded video generated as output by encoder 402. Encoder 402 may repeat this process using, for example, stochastic gradient descent techniques to minimize or otherwise reduce differences between an input video x and a reconstructed video $\hat{x}$ resulting from decoding of a generated code z.

Code $\hat{z}$ may be compressed through a code model 408, which uses a probabilistic function p(z) to compress the generated code $\hat{z}$ into a bitstream for output to a decoder 406. The decoder passes a generated code through a function p(x|z) to generate a decoded video $\hat{x}$, which may be an approximation of the compressed video x. The decoded video x̂ may be similar to compressed video x, but may not exactly replicate compressed video x due to information lost during the compression and decompression process.

Code model 408 may learn the probability distribution for an input code z using a probabilistic auto-regressive model. The probability distribution may be conditioned on its previous values and may be represented by the equation:

$$P(z) = \prod_{t=0}^{T}\prod_{c=0}^{C}\prod_{w=0}^{W}\prod_{h=0}^{H} p(z_{t,c,w,h} | z_{0:t,0:c,0:w,0:h})$$

where t is a time index for all time between the start of the video at t=0 to the end of the video at t=T, where c is a channel index for all channels C, where w is a width index for a total video frame width W, and where h is a height index for a total video frame height H.

The probability distribution P(z) may be predicted by a fully convolutional neural network of causal convolutions. In some aspects, the kernels of each layer of the convolutional network may be masked such that the convolutional network is aware of previous values $z_{0:t,0:c,0:w,0:h}$ and may not be aware of other values in calculating a probability distribution. In some aspects, a final layer of the convolutional network may include a softmax function that determines the probability of a code in latent space being applicable over an input value (e.g., a likelihood that a given code can be used to compress a given input). While training code model 408, the softmax function may use a one-hot vector, and while testing, code model 408 may select the code associated with the highest probability.

In some aspects, code model 408 may be implemented using four-dimensional convolutions. A four-dimensional convolution may be represented by the equation:

$$P(z) = \Pi_{t=0}^{T}\Pi_{c=0}^{C}\Pi_{w=0}^{W}\Pi_{h=0}^{H} p(z_{t,c,w,h}|z_{0:t,0:c,0:w,0:h}).$$

Using four-dimensional convolutions in this manner may be computationally expensive due, in part, to the number of parameters to be calculated. To accelerate generation of the probability distribution, a different factorization of dependencies may be used, as shown below:

$$P(z) \approx \Pi_{t=0}^{T}\Pi_{c=0}^{C}\Pi_{w=0}^{W}\Pi_{h=0}^{H} p(z_{t,c,w,h}|z_{t,0:c,0:w,0:h},\varphi_{0:t-1,0;C,0:W,0:W}).$$

With this factorization, code model 408 is implemented as a three-dimensional convolutional model conditioned on time. The factorization may examine previous codes at a given time t and a conditioning signal φ associated with the codes up to time t. Conditioning signal φ may be obtained by passing the codes from the previous time steps (e.g., $z_{0:t-1,0:C,0:W,0:W}$) through a set of convolutional long short-term memory (LSTM) layers.

The autoencoder 400 may be interpreted as a deterministic variational autoencoder (VAE), defined according to the loss function:

$$\log p_\theta(x) \geq E_{q_\phi(z|x)}[\log p_\theta(x|z)] - KL(q_\phi(z|x)\|p_\theta(z))$$

where the reconstruction cost of the resulting compressed video generated by the autoencoder is represented by the equation $\mathcal{L}(x, \hat{x}) = E_{q_\phi(z|x)}[\log p_\theta(x|z)]$ and the coding cost of code model 408 is represented by the equation $|\log p(z) = KL(q_\phi(z|x)\|p_\theta(z))$.

To train encoders and decoders that compress and decompress content using deep generative models, a deep neural network, such as a variational autoencoder, can learn a latent variable model in which latent variables capture important information to be transmitted (and preserved) in a compressed version of an input. The original input can be approximately reconstructed from the compressed version of the input. The reconstruction of the input from the compressed version of the input may not be an exact, lossless, version of the original input, but may approximate the original input (with varying amounts of difference between the reconstruction and the original input based on the amount of compression loss involved in compressing the original input into a code in a latent space, as discussed in further detail below. Generally, compression using deep generative models may be defined in terms of a joint model of data x and discrete latent variables z according to the equation $$p_\theta(x,z) = p_\theta(z)p_\theta(x|z)$$

where $p_\theta(z)$ represents a code model and $p_\theta(x|z)$ represents a likelihood/decoder. Both the code model and the likelihood/decoder may be defined as deep neural networks, as discussed below. Because the likelihood $\log p_\theta(x) = \log \int p_\theta(z)p_\theta(x|z)dz$ is intractable, the variational bound defined by the equation $-\log p(x) \leq E_q[-\log p(x|z)] + KL[q(z|x)|p(z)]$ may be optimized, where q(z|x) represents an approximate posterior. In a variational autoencoder, neural networks can be used to parameterize q(z|x) and p(x|z), which may respectively represent the encoder and decoder components of a variational autoencoder.

Generally, a variational autoencoder used in a video compression and decompression pipeline may be interpreted as a regularized autoencoder, where the first term of the loss function measures the reconstruction error and the KL term, representing a divergence between a probability distribution and a reference probability distribution, acts as a regularizer. The reconstruction error term may, for example, measure the expected number of bits needed to encode an input x given a known sample z∼q(z|x), which represents a sample set of codes that an input x can be mapped to. A code for input x may be derived from a decoder distribution $p_\theta(x|z)$, which may assign approximately $-\log p_\theta(x|z)$ bits to x, and averaged over q, the reconstruction term may be obtained. It should be noted that in lossy compression, x is generally not encoded using $p_\theta(x|z)$, but rather code z is output, and the reconstruction cost term represents a distortion factor. The KL term generally relates to the cost of coding generating codes z in the latent space coming from the encoder q(x|z) using an optimal code derived from the prior p(z). Generally, the optimal code derived from the prior p(z) may use around $-\log p(z)$ bits to encode z. Averaged over the encoder q(z|x), the average coding cost for encoding an input x into a code z may be equal to the cross-entropy between q and p, represented by the equation:

$$E_{q_\theta(z|x)}[\log p_\theta(x|z)] = CE[q(z|x)|p(z)]$$

The cross-entropy may be related to the KL loss via the relation KL[q|p]=CE[q|p]−H[q], where H[q] represents the entropy of the encoder q. The KL loss may thus measure a coding cost, with a discount worth H[q] bits representing a degree of randomness from the encoder. Using techniques such as bits-back coding, lossless compression may be achieved by transmitting z∼q(z|x) and recovering H[q] bits. To achieve lossy compression, however, the cross-entropy may provide a more suitable loss function than the KL loss, and when using discrete latents, the entropy H[q] may be a value that can be added to the right hand side of the variational bound equation discussed above (e.g., to $E_q[-\log$ p(x|z)]+KL[q(z|x)|p(z)]) and allow for the generation of a valid bound. Thus, a rate distortion loss may be represented by the equation:

$$\mathcal{L}_{(x)} = E_{q(z|x)}[-\log p(x|z) - \beta \log p(z)]$$

where β represents a rate-distortion tradeoff parameter.

The cross-entropy loss may not include a discount for encoder entropy. To account for encoder entropy and make an encoder more deterministic, and for a fixed p(z) and p(x|z), a deterministic ("one-hot") distribution may be defined such that the code z minimizes −log p(x|z)−β log p(z). Using a deterministic encoder, the rate distortion loss may be equivalent to a variational bound represented by the equation −log p(x)≤E$_q$[−log p(x|z)]+KL[q(z|x)|p(z)] because H[q]=0 and thus KL[q|p]=CE [q|p] (i.e., the KL loss function and cross-entropy loss function are identical).

Further efficiencies in encoding and decoding video content may be realized by taking a reconstruction cost and a coding cost into account when encoding and decoding content, as discussed in further detail below. For example, where content to be compressed includes information for which fidelity should preserved and other information for which preservation of fidelity may not be critical, different levels of compression may be used to achieve the desired amount of fidelity preservation for different types of information in the content. Less lossy compression may be applied to information for which fidelity should be preserved (e.g., foreground content in an image), and lossier compression may be applied to information for which fidelity preservation may not be critical (e.g., background content in an image, stationary content across a plurality of images in a stream of images, etc.)

Figure 4B:
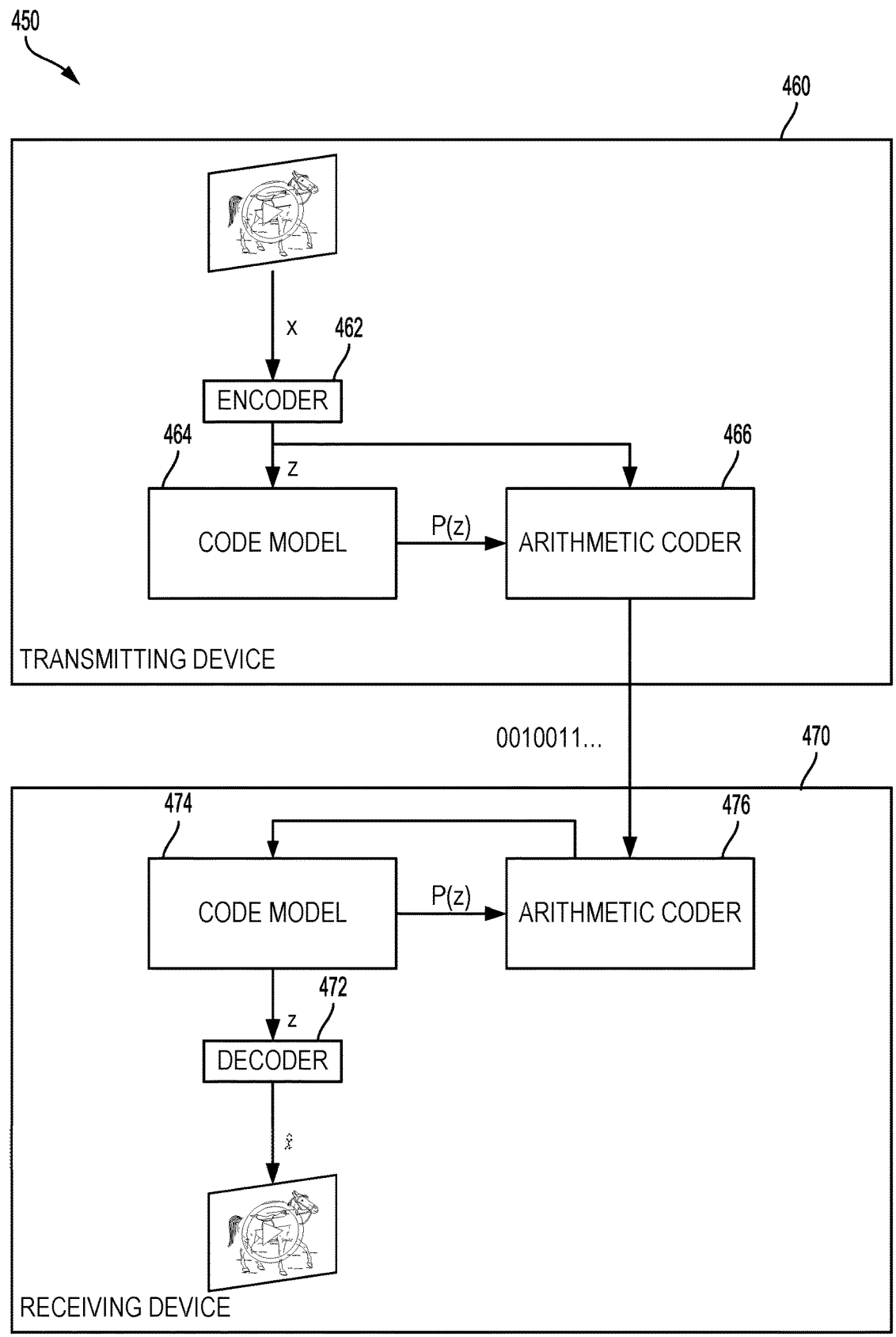
FIG. 4B illustrates an example pipeline for compressing and decompressing video content using encoders and decoders implemented as artificial neural networks, according to aspects of the present disclosure.

FIG. 4B illustrates a system 450 including a transmitting device 460 that compresses video content and transmits the compressed video content to a receiving device 470 for decompression and output on receiving device 470 and/or video output devices connected to receiving device 470. As illustrated, the transmitting device 460 includes a video compression pipeline, and receiving device 470 includes a bitstream decompression pipeline. The video compression pipeline in transmitting device 460 and the bitstream decompression pipeline in receiving device 470 generally use one or more artificial neural networks to compress video content and/or decompress a received bitstream into video content, according to aspects of the present disclosure. As illustrated, the video compression pipeline in the transmitting device 460 includes an encoder 462, a code model 464, and an arithmetic coder 466, and the video decompression pipeline in the receiving device 470 includes decoder 472, code model 474, and arithmetic coder 476.

Encoder 462 generally performs lossy compression on received uncompressed video content by mapping pixels in multiple frames of the uncompressed video content to a latent code space. Generally, encoder 462 may be configured such that the codes representing an encoded video are discrete or binary. These codes may be generated based on stochastic perturbation techniques, soft vector quantization, or other techniques that can generate distinct codes. In some aspects, encoder 462 may map uncompressed video to codes having a compressible (low entropy) distribution. These codes may be close in cross-entropy to a predefined or learned prior distribution.

Encoder 462 may be implemented using a convolutional architecture. In some aspects, encoder 462 may be configured as a three-dimensional convolutional neural network (CNN) such that encoder 462 learns spatio-temporal filters for mapping video to a latent code space. In such a network, encoder 462 may encode video in terms of a key frame (e.g., an initial frame marking the beginning of a sequence of frames in which subsequent frames in the sequence are described as a difference relative to the initial frame in the sequence), warping (or differences) between the key frame and other frames in the video, and a residual factor. In other aspects, encoder 462 may be implemented as a two-dimensional neural network conditioned on previous frames, a residual factor between frames, and conditioning through stacking channels or including recurrent layers.

To compress a video, as illustrated, encoder 462 may receive a video x for compression. The encoder 462 may divide the video x into a plurality of blocks, and each block may be defined as a vector (x, y, t) representing a portion of the video x centered at pixel coordinates (x, y) at time t. An inference performed by encoder 462 may thus result in the generation of a code z representing a latent space encoding of the video x or a portion thereof. The code z generally represents a lossily-compressed version of video x such that, when decoded by a decoder (e.g., decoder 472 at receiving device 470, as discussed below), an approximation x̂ of video x is generated. Further, the code z represents a compressed version of the video x such that code z is smaller than the video x or portion thereof represented by code z.

Code model 464 receives the code z representing an encoded video or portion thereof and generates a probability distribution P(z) over a set of compressed codewords that can be used to represent the code z. Code model 464 may comprise a probabilistic auto-regressive generative model, for example. In some aspects, the codes for which a probability distribution may be generated may comprise a learned distribution that controls bit assignment based on an adaptive arithmetic coder 466. For example, using adaptive arithmetic coder, a compression code for a first z may be predicted in isolation; a compression code for a second z may be predicted based on the compression code for the first z; a compression code for a third z may be predicted based on the compression codes for the first z and the second z, and so on. The compression codes generally represent different spatio-temporal chunks of a given video to be compressed. Each code $z_{t,c,w,h}$, representing a code indexed by time, channel, and horizontal and vertical position may be predicted based on a previous code, which may be a fixed and theoretically arbitrary ordering of codes. In some aspects, the codes may be generated by analyzing a given video file from start to finish and analyzing each frame in a raster scan order.

In some aspects, z may be represented as a four-dimensional tensor. The four dimensions of the tensor may include a time dimension, a channel dimension, and height and width spatial dimensions. In some embodiments, the channel dimensions may include different color channels (the red, green, and blue channels in various RGB color spaces, such as Adobe RGB, sRGB, NTSC, UHD, or Rec. 709 color spaces). In some aspects, the channels may refer to a number of channels of a wireless network (e.g., 64 channels, 128 channels, etc.).

Arithmetic coder 466 uses the probability distribution P(z) generated by code model 464 and the code z generated by encoder 602 to outputs a bitstream corresponding to a prediction of the code z. The prediction of code z may be represented as the code having a highest probability score in a probability distribution P(z) generated over a set of possible codes. In some aspects, arithmetic coder 466 may output a bitstream of variable length based on the accuracy of a prediction of code z and the actual code z generated by encoder 462. For example, the bitstream may correspond to a short codeword if the prediction is accurate, whereas the bitstream may correspond to longer codewords as a magnitude of a difference between code z and the prediction of code z increases. The bitstream may be output by arithmetic coder 466 for storage in a compressed video file, transmission to a requesting device (e.g., as illustrated in FIG. 4B, receiving device 470), and the like. Generally, the bitstream output by arithmetic coder 466 may losslessly encode z such that z may be accurately recovered during decompression processes applied on a compressed video file.

At receiving device 470, the bitstream generated by arithmetic coder 466 and transmitted from transmitting device 460 may be received by receiving device 470. Transmission between transmitting device 460 and receiving device 470 may occur via any of various suitable wired or wireless communication technologies. Communication between transmitting device 460 and receiving device 470 may be direct or may be performed through one or more network infrastructure components (e.g., base stations, relay stations, mobile stations, network hubs, etc.).

As illustrated, receiving device 470 may include an arithmetic coder 476, a code model 474, and a decoder 472. Decoder 472 may be trained by autoencoder 400 using the same or set used to train encoder 462 so that decoder 472, for a given input, can reconstruct an approximation of an input encoded by encoder 462.

The received bitstream may be input into arithmetic coder 476 to obtain one or more codes z from the bitstream. As illustrated, arithmetic coder 476 may output the received bitstream to code model 474, which uses a probability distribution P(z) generated over a set of possible codes and information associating each generated code z with a bitstream to recover the code z from the received bitstream. More specifically, given a received portion of the bitstream and a probabilistic prediction of the next code z, arithmetic coder 476 may produce a new code z as it was encoded by arithmetic coder 466 at transmitting device 460. Using the new code z, arithmetic coder 476 may make a probabilistic prediction for a successive code z (and the bitstream associated with the successive code z in arithmetic coder 476), read an additional part of the bitstream, and decode the successive code z until the entire received bitstream is decoded into a code z by code model 474. The decompressed code z may be provided by code model 474 to decoder 472, which decompresses code z and outputs an approximation x̂ of video content x. The approximation x̂ of video content x at receiving device 470 may be recovered and displayed on a screen communicatively coupled to or integral with receiving device 470.

Figure 5:
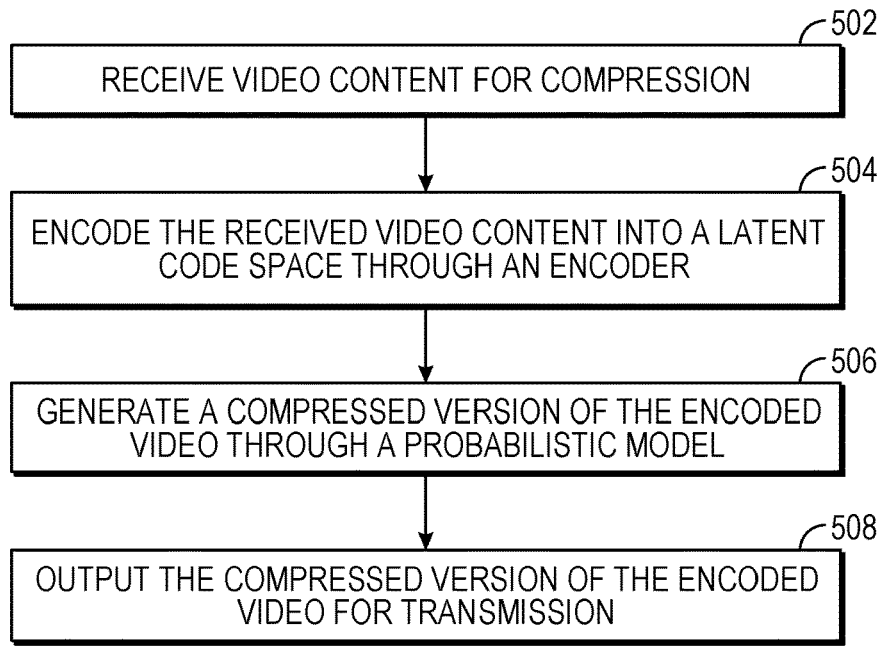
FIG. 5 illustrates example operations for compressing received video content through a compression pipeline including an encoder implemented by a neural network and a probabilistic model, according to aspects of the present disclosure.

FIG. 5 illustrates example operations 500 for compressing video content in a deep neural network, according to aspects described herein. Operations 500 may be performed by a system with one or more processors (e.g., CPU, DSP, GPU, etc.) implementing the deep neural network. For example, the system may be transmitting device 410.

As illustrated, operations 500 begin at block 502, where the system receives video content for compression. The video content may, for example, include uncompressed video content comprising a number of frames of a given height and width and associated with a given frame rate.

At block 504, the system encodes the received video content into a latent code space through an encoder. As discussed, the encoding of received, uncompressed video content x into a latent code space may result in generation of one or more codes z such that decoding of the one or more codes z results in an approximation x̂ of the uncompressed video x.

At block 506, the system generates a compressed version of the encoded video through a probabilistic model. As discussed, the compressed version of the encoded video may be generated based on a probability distribution of codes usable for compressing the encoded video z, where higher probability codes have shorter code words and lower probability codes have longer code words.

At block 508, the system outputs the compressed version of the encoded video for transmission. The compressed version may be output for transmission to the same or a different device with the system. For example, the compressed version may be output for a transmission to a storage device (e.g., local storage or remote storage), a remote service (e.g., a video hosting service), a requesting device (e.g., receiving device 420), or the like.

According to certain aspects, the encoder is trained by receiving first video content, encoding the first video content into the latent code space, generating a reconstructed version of the first video content by decoding the encoded first video content; comparing the reconstructed version of the first video content to the received first video content, and adjusting the encoder based on the comparing. For certain aspects, adjusting the encoder involves performing a gradient descent.

According to certain aspects, the encoder is configured to encode the received video content into the latent code space. Encoding of the received video content into the latent code space may be based on a three-dimensional filter. Dimensions of the three-dimensional filter may include height of a video frame, width of the video frame, and time of the video frame.

According to certain aspects, the trained probabilistic model includes an auto-regressive model of a probability distribution over four-dimensional tensors. The probability distribution generally illustrates a likelihood that different codes can be used to compress the encoded video content. For certain aspects, the probabilistic model generates data based on a four-dimensional tensor. In this case, dimensions of the four-dimensional tensor may include time, a channel, and spatial dimensions of the video content, for example. For certain aspects, the probability distribution is generated based on a factorization of dependencies. In this case, the factorization of dependencies may represent the probability distribution based on a code associated with a current time slice in the video content and a conditioning signal. The conditioning signal may, for example, include an output generated by a recurrent neural network for an input of codes associated with previous time slices in the video content other than the current time slice. For certain aspects, the recurrent neural network includes a set of convolutional long short-term memory (LSTM) layers.

Example Video Decompression Using Deep Generative Models

Figure 6:
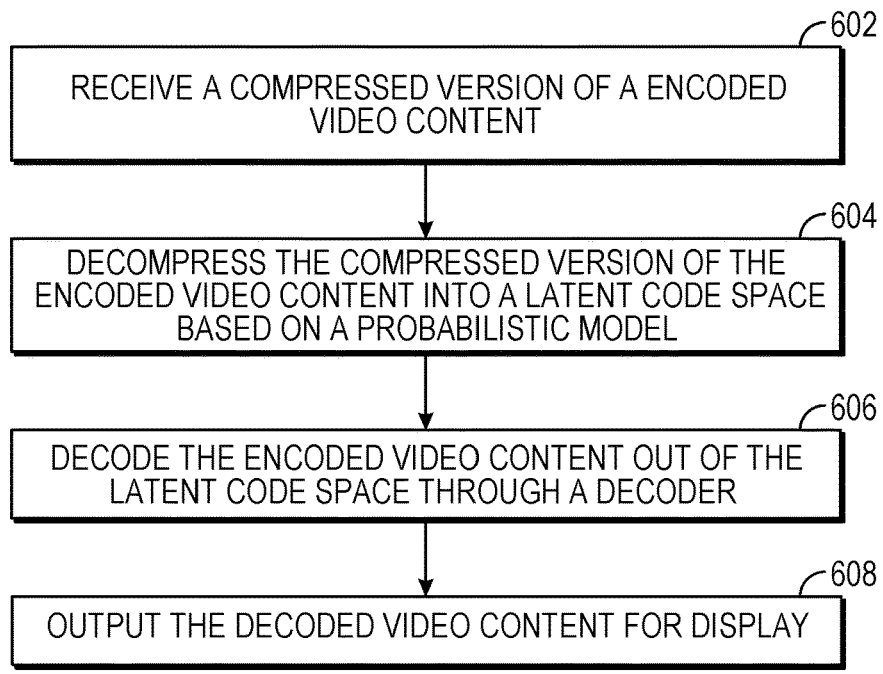
FIG. 6 illustrates example operations for decompressing encoded video, according to aspects of the present disclosure.

FIG. 6 illustrates example operations 600 for decompressing encoded video (e.g., a received bitstream) into video content in a deep neural network according to aspects described herein. Operations 600 may be performed by a system with one or more processors (e.g., CPU, DSP, GPU, etc.) implementing the deep neural network. For example, the system may be receiving device 420.

As illustrated, operations 600 begin at block 602, where the system receives a compressed version of an encoded video content (e.g., from a transmitting device). The compressed version of the encoded video content may be received, for example, as a bitstream including one or more code words corresponding to one or more codes z representative of a compressed video or portion thereof.

At block 604, the system generates a decompressed version of the encoded video content into a latent code space based on a probabilistic model. The system may identify one or more codes z corresponding to the received compressed version of the encoded video content based on a probability distribution of codes that may have been used to compress the encoded video. In some cases, the system may identify one or more codes based on a length of each code word, where higher probability codes have shorter code words and lower probability codes have longer code words.

At block 606, the system decodes the decompressed version of the encoded video content out of the latent code space using a decoder. As discussed, the decoder may be trained so that the decoding of the one or more codes z in the decompressed version of the encoded video results in an approximation $\hat{x}$ representing uncompressed video x. Each code z may represent a portion of a latent code space from which the approximation $\hat{x}$ representing uncompressed video x may be generated.

At block 608, the system outputs the decoded video content for playback. The system may output the decoded video content for playback on one or more display devices communicatively coupled to or integral with the system.

According to certain aspects, the decoder is trained by receiving first video content; encoding the first video content into the latent code space; generating a reconstructed version of the first video content by decoding the encoded first video content; comparing the reconstructed version of the first video content to the received first video content; and adjusting the decoder based on the comparing.

According to certain aspects, the decoder is configured to decode the encoded video content out of the latent code space. Decoding of the received video content out of the latent code space may be based on a three-dimensional filter. Dimensions of the three-dimensional filter may include height of a video frame, width of the video frame, and time of the video frame.

According to certain aspects, the probabilistic model includes an auto-regressive model of a probability distribution over four-dimensional tensors. The probability distribution generally illustrates a likelihood that different codes can be used to decompress the encoded video content. For certain aspects, the probabilistic model generates data based on a four-dimensional tensor. In this case, dimensions of the four-dimensional tensor may include time, a channel, and spatial dimensions of the video content, for example. For certain aspects, the probability distribution is generated based on a factorization of dependencies. In this case, the factorization of dependencies may represent the probability distribution based on a code associated with a current time slice in the video content and a conditioning signal. For certain aspects, the conditioning signal includes an output generated by a recurrent neural network for an input of codes associated with previous time slices in the video content other than the current time slice. The recurrent neural network may include a set of convolutional long short-term memory (LSTM) layers.

Example Semantically Aware Compression of Video Content

In some cases, video content may include content that varies in importance or interest to a user receiving the video content. For example, video content may include foreground information (e.g., image data correlated to the subject of the video, such as a person captured on a video camera) and background information (e.g., image data correlated to the environment in which the video is captured). In another example, some video content may include confidential or otherwise protected information that some users may not be allowed to see, and other information that these users may be allowed to see. For example, in a videoconferencing scenario, documents, notes on a whiteboard or chalkboard, or other information may be within the field of view of a camera; however, other participants in the video conference need not see such information and, in some cases, should not see such information.

To reduce the size of the compressed video and/or adjust the quality of compressed video to compress relevant information (e.g., a user's face, image data that does not include confidential information, etc.), aspects described herein use image masks in an encoding process to perform semantically aware compression of video content, which, as discussed in further detail below, adjusts a quality of compression for different portions of a captured video clip. Generally, the image masks may include information, learned from other video clips and the masks associated with those video clips, identifying areas of a video to be compressed using higher quality compression and areas of a video to be compressed using lower quality compression. The areas of the video compressed using higher quality compression may be compressed so as to minimize, or at least reduce, loss of visual acuity when decompressed on a receiving device (e.g., using visually lossless or minimally lossy algorithms), while the areas to be compressed using lower quality compression may be compressed using any of various degrees of visually lossy compression (e.g., compression in which visual details included in the originally captured video are blurred or otherwise reproduced with low visual acuity when decompressed). In some embodiments, the image masks may allow for multiple levels of visually lossy compression to be applied to the areas to be compressed using lower quality compression. For example, increasingly lossy compression may be applied to the compressed video based on a distance from the areas of the video compressed using higher quality (e.g., visually lossless or minimally lossy) compression such that objects closer to the areas of the video compressed using higher quality compression can be rendered with higher acuity than objects that are further away from the areas of the video compressed using higher quality compression.

Generally, reconstruction loss in neural network-based video encoding and compression pipeline may be defined as a sum of pixel losses over all pixels in the compressed video. Pixel losses may be represented as L2 loss (e.g., the mean squared error loss on predicted pixels), PSNR (peak signal-to-noise ratio) loss, MS-SSIM (multiscale structural similarity) loss, or other metrics. The reconstruction loss in the neural network-based video encoding and compression pipeline may be represented by the equation:

$$\ell_{rec}(x, \hat{x}) = \sum_i \sum_j \ell(x_{ij}, \hat{x}_{ij})$$

where x represents an input frame and $\hat{x}$ represents a reconstructed frame. This equation may be extended to the equation:

$$\ell_{rec}(x, \hat{x}) = \sum_i \sum_j \alpha * m_{ij} * \ell(x_{ij}, \hat{x}_{ij}) + (1 - m_{ij}) * \ell(x_{ij}, \hat{x}_{ij})$$

where m represents a two-dimensional binary mask identifying an object of interest, α represents a coefficient controlling the reconstruction quality for objects of interest, and i and j represent pixel coordinates in videos x and x̂. During training of an encoder to perform semantically aware compression of video content, two-dimensional mask m may be received from an object segmentation model trained to recognize video content of interest (and thus, video content to be compressed using higher quality compression) from video content of lesser importance (and thus, video content to be compressed using lower quality compression. The object segmentation model may include models trained using the Mask Recurrent Convolutional Neural Network (MaskRCNN) algorithm or other algorithms that can identify content of interest (e.g., foreground content) and content of lesser interest (e.g., background content). The two-dimensional mask m need not be used in testing the encoder.

Coding loss for a compressed video may be represented as a sum of coding losses (e.g., cross-entropy) over elements in the latent space into which the video content is encoded and may be represented according to the equation:

$$\ell_{coding}(z, \hat{z}) = \sum_i \sum_j \ell(z_{ij}, \hat{z}_{ij})$$

where z and ẑ represent latent variables predicted by an encoder and a code model. The equation representing coding loss for a compressed video may be expanded to the following equation:

$$\ell_{rec}(z, \hat{z}) = \sum_i \sum_j \alpha * m_{ij} * \ell(z_{ij}, \hat{z}_{ij}) + (1 - m_{ij}) * \ell(z_{ij}, \hat{z}_{ij})$$

where m represents a two-dimensional binary mask identifying an object of interest and a represents a coefficient controlling a coding cost for the object of interest. As discussed above, the binary mask m may be received from an object segmentation model (e.g., trained using the MaskRCNN algorithm) while generating inferences (e.g., compressing video content into a code z) and need not be used in testing the code model.

Figure 7:
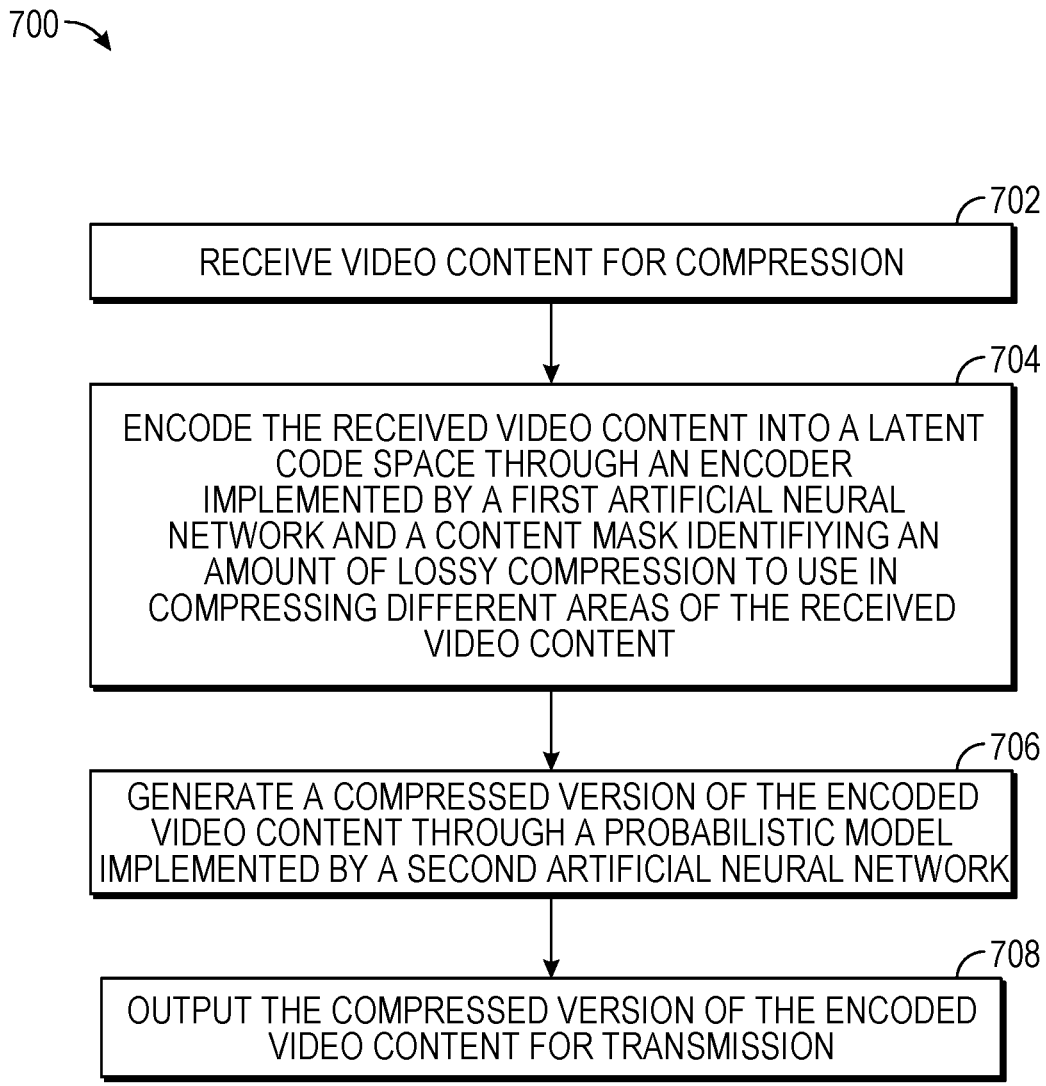
FIG. 7 illustrates example operations for compressing video content based on semantically aware context masks, according to aspects of the present disclosure.

FIG. 7 illustrates example operations 700 for performing semantically aware compression of video content in a neural network-based video compression pipeline, according to aspects described herein. Operations 700 may be performed by a system with one or more processors (e.g., CPU, DSP, GPU, etc.) implementing the deep neural network. For example, the system may include or be implemented as transmitting device 410.

As illustrated, operations 700 begin at block 702, where the system receives video content for compression. The video content may, for example, include uncompressed video content comprising a number of frames of a given height and width and associated with a given frame rate.

At block 704, the system encodes the received video content into a latent code space through an encoder and utilizing a content mask. The encoder may be implemented by a first artificial neural network. The content mask may identify an amount of lossy compression to use in compressing different areas of the received video content. For example, as discussed above, the content mask may comprise a binary mask in which some areas of video content (e.g., foreground content) are designated for higher quality compression and other areas of video content (e.g., background content) are designated for lower quality compression. As discussed, the encoding of received, uncompressed video content x into a latent code space may result in generation of one or more codes z such that decoding of the one or more codes z results in an approximation x̂ of the uncompressed video x.

At block 706, the system generates a compressed version of the encoded video through a probabilistic model implemented by a second neural network. As discussed, the compressed version of the encoded video may be generated based on a probability distribution of codes usable for compressing the encoded video z, where higher probability codes have shorter code words and lower probability codes have longer code words.

At block 708, the system outputs the compressed version of the encoded video for transmission. The compressed version may be output for transmission to the same or a different device as the system. For example, the compressed version may be output for transmission to a storage device (e.g., local storage or remote storage), a remote service (e.g., a video hosting service), a requesting device (e.g., receiving device 420), or the like.

According to certain aspects, the content mask comprises a binary mask trained by identifying foreground and background content in a plurality of training videos.

According to certain aspects, encoding the received video content into the latent code space comprises quantizing foreground content using a first amount of compression loss, and quantizing background content using a second amount of compression loss, wherein the first amount of compression loss is less than the second amount of compression loss.

According to certain aspects, the content mask is trained to recognize foreground and background content using a recurrent convolutional neural network.

According to certain aspects, the encoder is trained by receiving first video content, encoding the first video content into the latent code space, generating a reconstructed version of the first video content by decoding the encoded first video content, comparing the reconstructed version of the first video content to the received first video content, and adjusting the encoder based on the comparing. Adjusting the encoder may comprise, for example, performing a gradient descent. According to certain aspects, the encoder is further trained by receiving content masks for the first video content, and conditioning the encoder to encode the first video content into the latent code space based on foreground and background information included in the content masks for the first video content.

According to certain aspects, the encoder is configured to encode the received video content into the latent code space based on a multi-dimensional filter. The dimensions of the multi-dimensional filter may comprise height of a video frame, width of the video frame, time of the video frame, and color information from each of a plurality of color channels.

According to certain aspects, the trained probabilistic model comprises an auto-regressive model of a probability distribution over four-dimensional tensors. The probability distribution generally illustrates a likelihood that different codes can be used to compress the encoded video content. According to certain aspects, the probabilistic model generates data based on a four-dimensional tensor, and dimensions of the four-dimensional tensor may comprise time, a channel, and spatial dimensions of the video content.

Figure 8A:
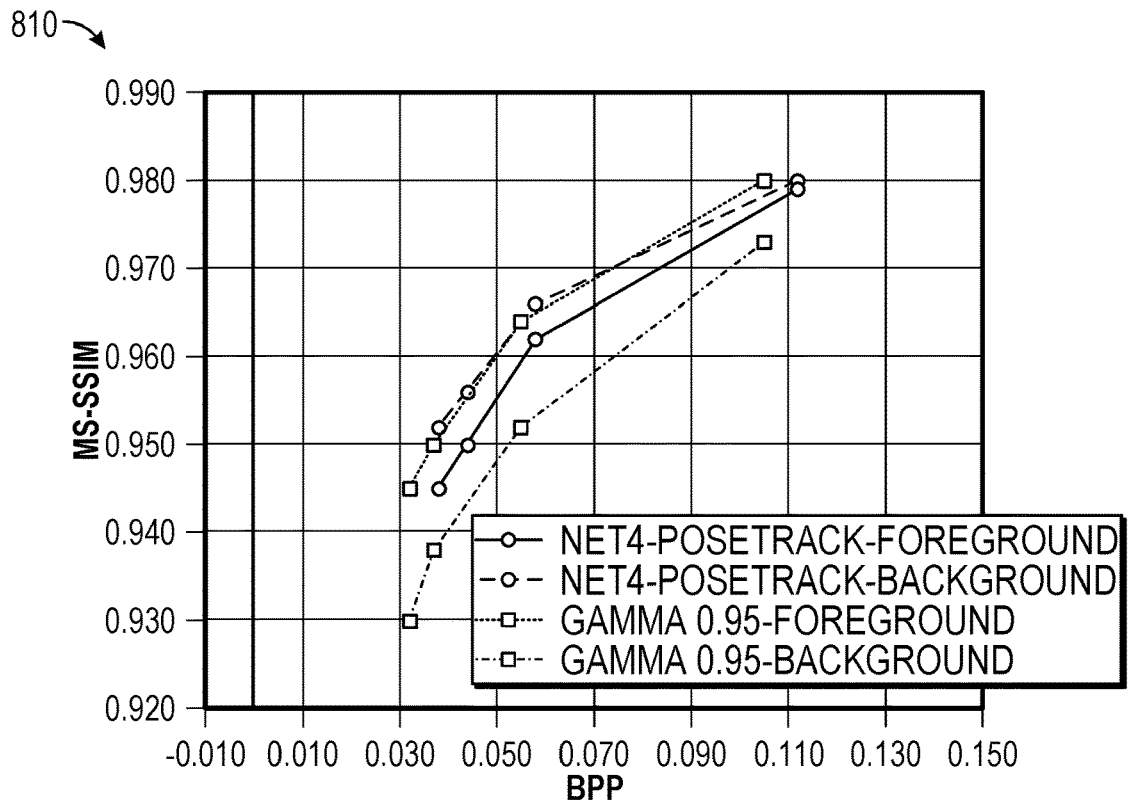
FIGS. 8A and 8B illustrate example simulation results of compressing video content comparing use of semantically aware context masks to conventional video compression methods, according to aspects of the present disclosure.
Figure 8B:
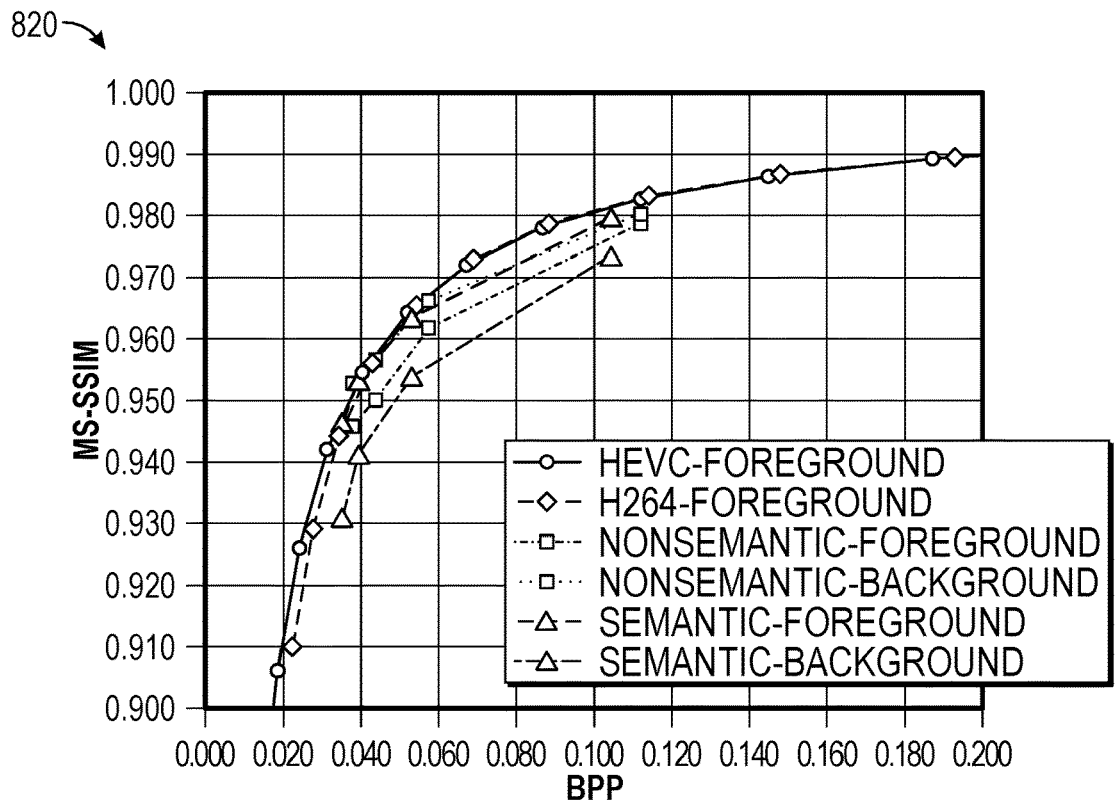

FIGS. 8A and 8B illustrate example simulation results comparing video content compressed using the semantic compression techniques described herein and conventional compression techniques. Graph 810 illustrates a comparison between reconstructed video similarity (e.g., MS-SSIM) and bits per pixel (BPP) in the compressed video generated by an encoder, according to aspects described herein. As illustrated, foreground content compressed using higher quality compression according to aspects of the present disclosure may have a similarity score comparable to that of foreground content compressed using learned video compression techniques that do not take into account content masks for any given number of bits per pixel, while background content compressed using lower quality compression according to aspects of the present disclosure may have a similarity score lower than that of background content compressed using learned video techniques that do not take into account content masks. Graph 820 illustrates a comparison between a priori defined compression algorithms (e.g., the H.264 algorithm) and learned compression using the semantic compression techniques described herein. As illustrated, foreground content compressed using the semantic compression techniques described herein may have a similarity score similar to that of videos compressed using a priori defined compression algorithms, while background content compressed using the semantic compression techniques described herein may have a similarity score lower than that of the videos compressed using a priori defined compression algorithms. By allowing for compression of background content using lower quality compression, aspects described herein may further generate storage and/or transmission efficiencies by compressing background content—which may typically involve irrelevant data—into smaller data sets.

Example Adaptive Compression of Video Content Based on Common Content Across Frames in the Video Content In some situations, video may be captured consistently from fixed environments. For example, security video from a fixed security camera may capture sequences of video in which the environment monitored by the security camera remains static (e.g., the video includes the same walls, ceilings, and other building features) and the dynamic content in the video includes people, animals, or other objects moving within the environment. In another example, dashcam video captured from a motor vehicle may include footage from roads captured from a fixed vantage point (e.g., from a camera mounted on a particular portion of a motor vehicle, such as a dashboard, grill, etc.). Because the vantage point from which these videos are captured may remain relatively constant, aspects described herein may leverage the similarities between different videos captured from the fixed vantage point in compressing these videos.

Generally, adaptive compression allows for a neural network to learn what the visual content captured from a fixed environment includes and to learn the kinds of motions that occur within the environment. For example, in a security camera deployment, the environment may include building features within the field of view of the camera; in a dashcam deployment, the environment may include road lines, barriers, lane markings, etc. that may be encountered consistently while driving. Neural networks (e.g., those implemented in encoder 462 illustrated in FIG. 4B) may learn and fine-tune model weights for these videos captured from the fixed vantage point to refine the compression applied to videos captured from the fixed vantage point.

Figure 9:
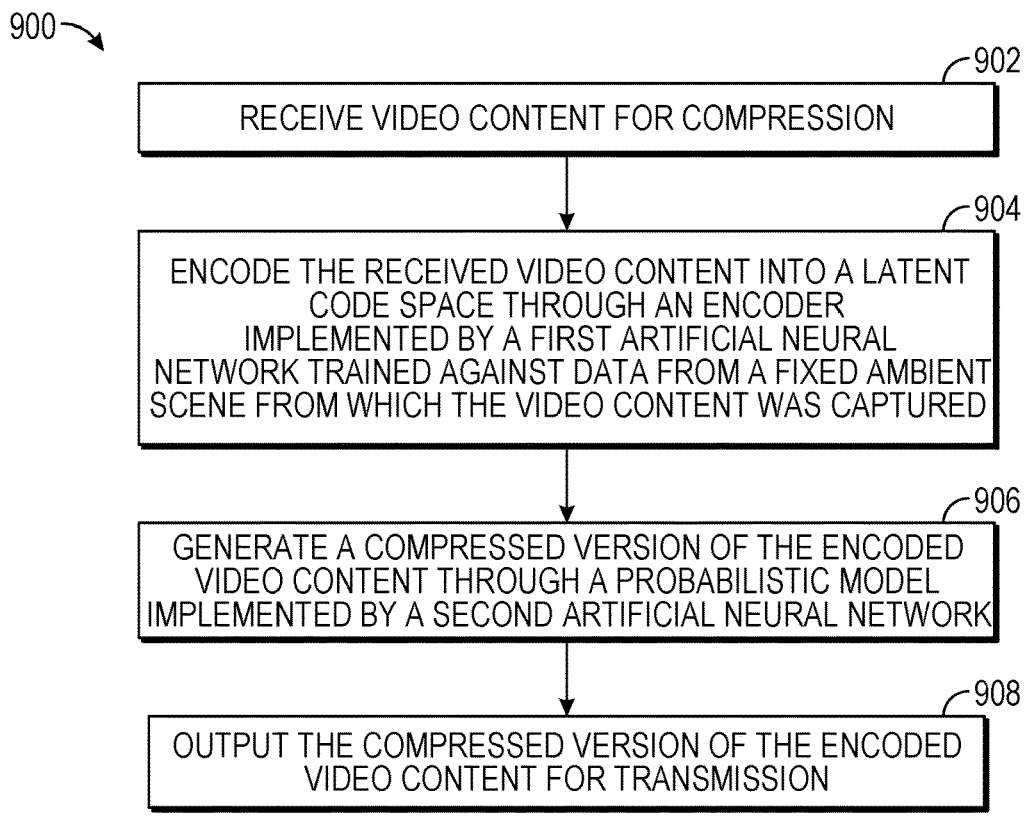
FIG. 9 illustrates example operations for compressing video content based on encodings learned from an environment in which video is captured, according to aspects of the present disclosure.

FIG. 9 illustrates example operations for performing adaptive compression of video content in a neural network-based video compression pipeline, according to aspects described herein. Operations 900 may be performed by a system with one or more processors (e.g., CPU, DSP, GPU, etc.) implementing the deep neural network. For example, the system may include or be implemented as transmitting device 410.

As illustrated, operations 900 begin at block 902, where the system receives video content for compression. The video content may, for example, include uncompressed video content comprising a number of frames of a given height and width and associated with a given frame rate.

At block 904, the system encodes the received video content into a latent code space through an encoder implemented by a first artificial neural network. The first artificial neural network may be trained against data from a fixed environment from which the video content was captured. The fixed environment may include, for example, a fixed ambient scene in the video content (e.g., in security camera footage, where building features may remain static across frames) or a fixed vantage point for captured video content (e.g., for dashcam footage, where the environment may change across frames, but each frame is captured from a fixed camera with a fixed angle of view). As discussed, by training an artificial neural network against data from a fixed environment, the system can learn the appearance of the environment from which the received video content was captured and compress video based on the learned appearance of the environment (which generally remains consistent across a plurality of videos depicting activity within the fixed environment).

At block 906, the system generates a compressed version of the encoded video through a probabilistic model implemented by a second neural network. As discussed, the compressed version of the encoded video may be generated based on a probability distribution of codes usable for compressing the encoded video z, where higher probability codes have shorter code words and lower probability codes have longer code words.

At block 908, the system outputs the compressed version of the encoded video for transmission. The compressed version may be output for transmission to the same or a different device with the system. For example, the compressed version may be output for a transmission to a storage device (e.g., local storage or remote storage), a remote service (e.g., a video hosting service), a requesting device (e.g., receiving device 420), or the like.

According to certain aspects, the encoder is trained by receiving first video content, encoding the first video content into the latent code space, generating a reconstructed version of the first video content by decoding the encoded first video content, comparing the reconstructed version of the first video content to the received first video content, and adjusting the encoder based on the comparing.

According to certain aspects, the first video content may comprise, for example, a plurality of video clips captured with the fixed environment. Encoding the first video content into the latent code space may comprise encoding fixed content in the plurality of video clips to a same code.

According to certain aspects, the plurality of video clips captured with the fixed environment may comprise video clips of a fixed ambient scene captured by a camera located in a fixed location. According to certain aspects, the plurality of video clips captured with the fixed environment may comprise video clips captured from a fixed vantage point on a moving platform.

Figure 10:
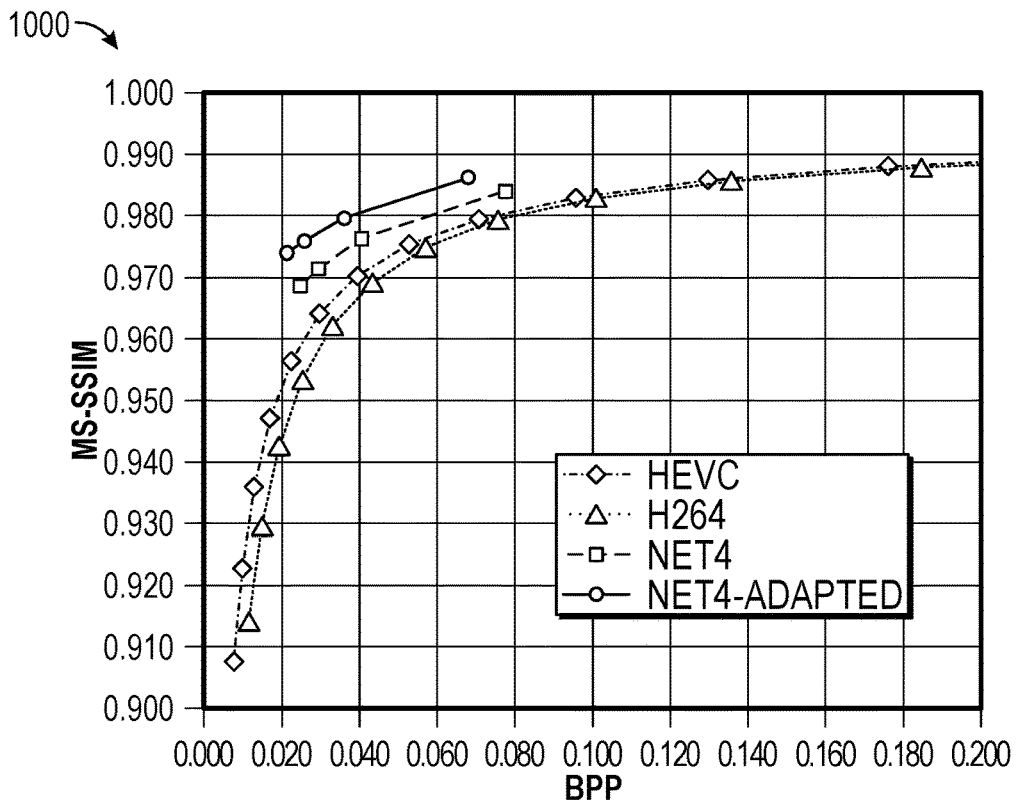
FIG. 10 illustrates example simulation results of compressing video content comparing use of encodings learned from an environment in which video is captured to conventional video compression methods, according to aspects of the present disclosure.

FIG. 10 illustrates example simulation results comparing video content compressed using the adaptive compression techniques described herein and conventional compression techniques. Graph 1000 illustrates a comparison between reconstructed video similarity and bits per pixel in the compressed video generated by neural network-based compression techniques described herein and a priori defined compression algorithms. As illustrated, at a given amount of compression, represented by the number of bits per pixel in the compressed video, the neural network-based compression techniques may result in videos having a higher similarity score to the originally captured video than videos compressed using a priori defined compression algorithms. Further, videos compressed using the adaptive compression techniques described herein may have a higher similarity score to the originally captured video than videos compressed using a neural network-based compressor that does not take into account consistencies in the data captured from a fixed ambient scene (or fixed vantage point).

Example Compression of Video Content Including Multiple Channels

Typically, video codecs may be defined a priori to compress videos including luminance information for a number of color channels (e.g., red, green, and blue color channels). However, some videos may be captured using a variety of non-standard devices that may record additional or alternative channels beyond color channels (e.g., a number of spatio-temporal signals). For example, RGB-D may allow for the recording of depth information in addition to color luminance information. In another example, spectral imaging may allow for the recording of information from multiple wavelengths outside of the visible spectrum. Still further, some video recording environments may leverage multiple cameras to record a subject from different vantage points. Aspects described herein allow for the compression of video including channels in addition to or other than luminance channels (e.g., luminance information for a grey channel or for a plurality of color channels) from a first camera.

Figure 11:
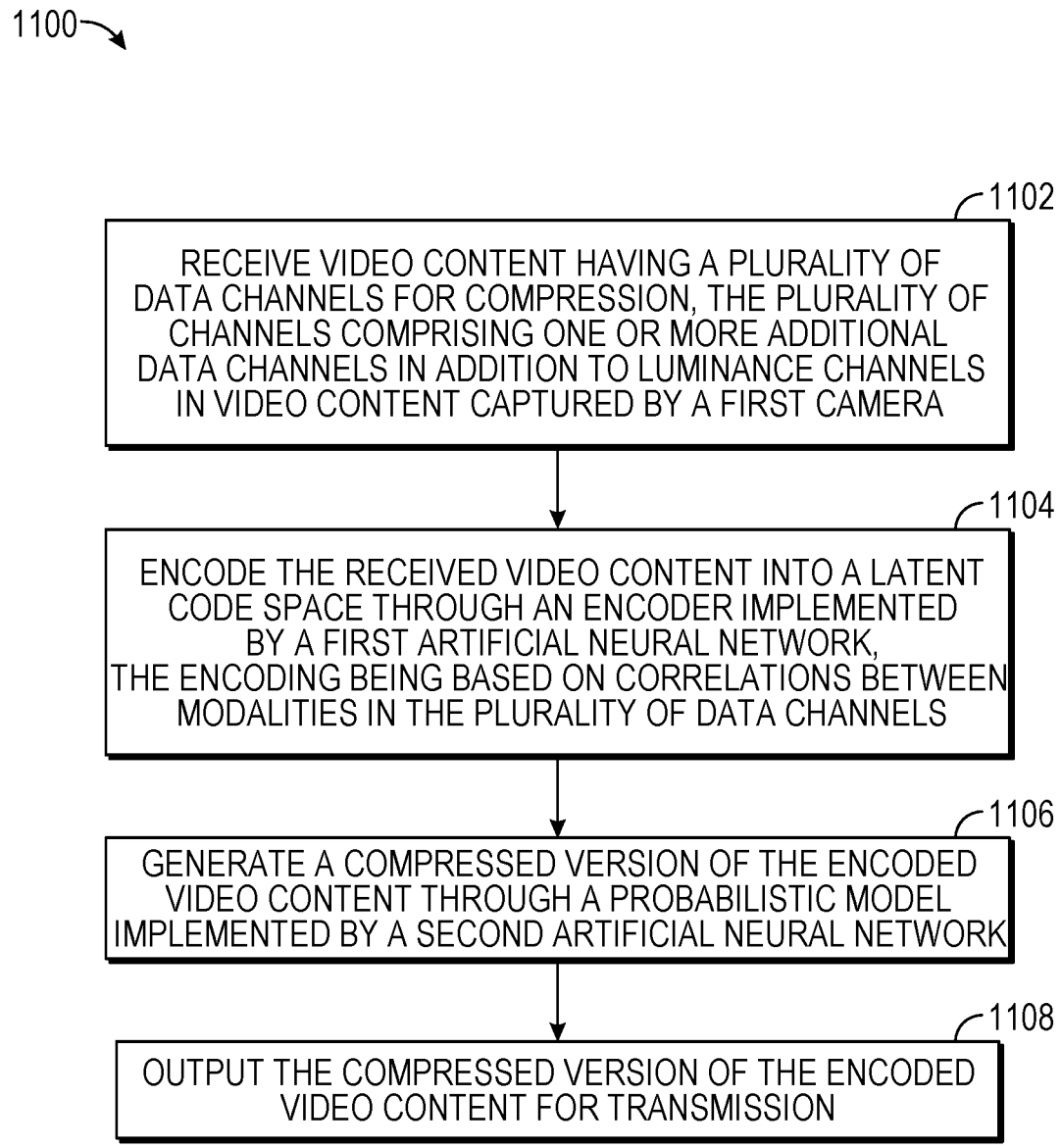
FIG. 11 illustrates example operations for compressing video content having additional channels in addition to or other than luminance channels from a camera, according to aspects of the present disclosure.

FIG. 11 illustrates example operations 1100 for compressing video content including a plurality of channels, according to aspects of the present disclosure. Operations 1100 may be performed by a system with one or more processors (e.g., CPU, DSP, GPU, etc.) implementing the deep neural network. For example, the system may include or be implemented as transmitting device 410.

As illustrated, operations 1100 begin at block 1102, where the system receives video content for compression having a plurality of channels. The video content may, for example, include uncompressed video content comprising a number of frames of a given height and width and associated with a given frame rate. The plurality of channels may include one or more additional data channels in addition to one or more luminance channels in video content recorded by a first camera.

At block 1104, the system encodes the received video content into a latent code space through an encoder implemented by a first artificial neural network. The encoding may, for example, be based on correlations between modalities in the plurality of data channels. These modalities may include, for example, positional information for a subject captured in the plurality of data channels and other similarities in the data captured in each of the plurality of data channels.

At block 1106, the system generates a compressed version of the encoded video through a probabilistic model implemented by a second neural network. As discussed, the compressed version of the encoded video may be generated based on a probability distribution of codes usable for compressing the encoded video z, where higher probability codes have shorter code words and lower probability codes have longer code words.

At block 1108, the system outputs the compressed version of the encoded video for transmission. The compressed version may be output for transmission to the same or a different device with the system. For example, the compressed version may be output for a transmission to a storage device (e.g., local storage or remote storage), a remote service (e.g., a video hosting service), a requesting device (e.g., receiving device 420), or the like.

According to certain aspects, the encoder may be trained by receiving first video content comprising data recorded in each of the plurality of data channels, encoding the first video content into the latent code space, generating a reconstructed version of the first video content by decoding the encoded first video content, comparing the reconstructed version of the first video content to the received first video content, and adjusting the encoder based on the comparing.

According to certain aspects, the plurality of data channels may include one or more color channels and a depth information channel. According to certain aspects, the plurality of data channels may include one or more channels capturing data within a range of visible wavelengths and one or more channels capturing data outside of the range of visible wavelengths. According to certain aspects, the plurality of data channels may include videos captured of a subject from different perspectives. The videos captured of the subject from different perspectives may be captured by the first camera and one or more second cameras.

Figure 12:
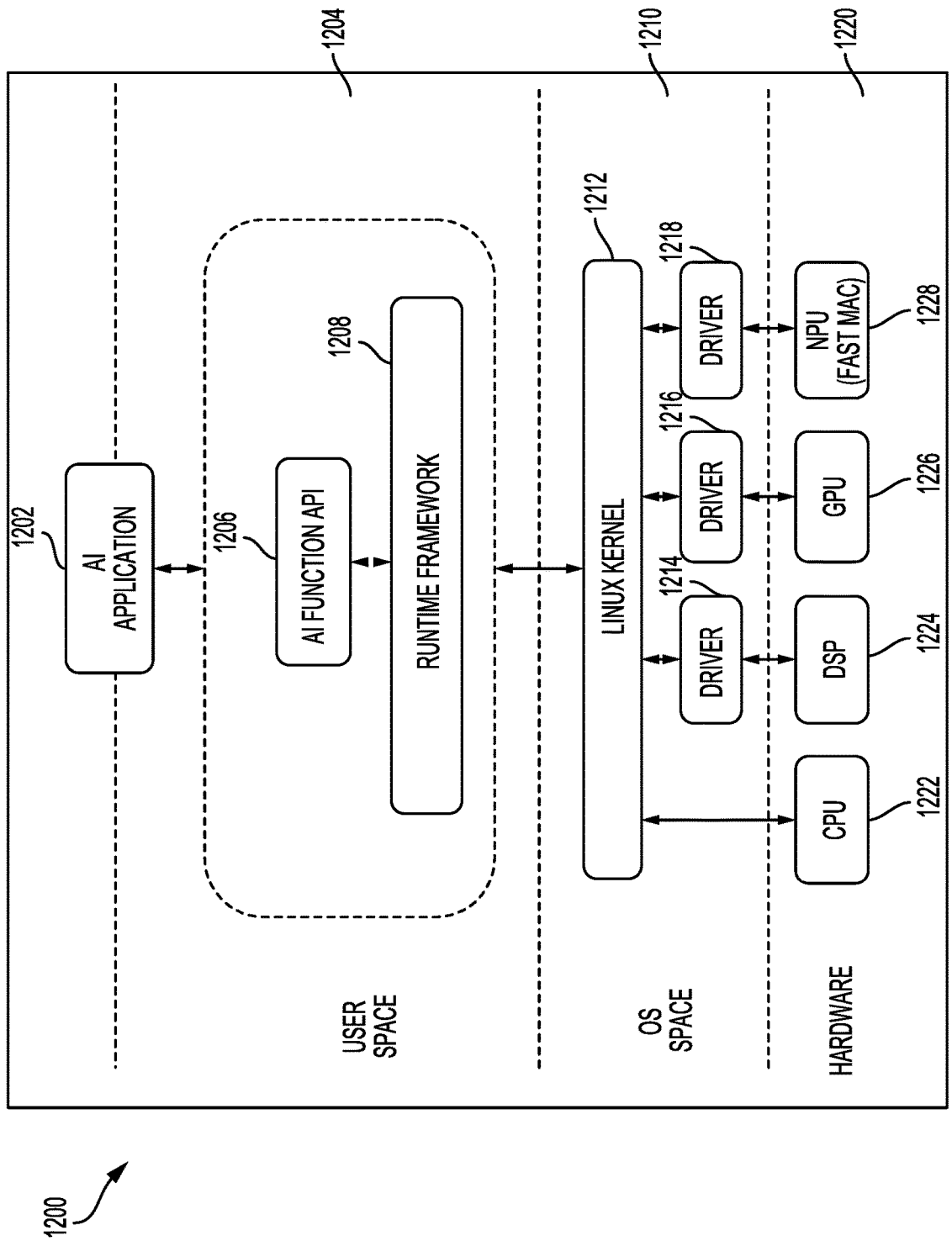
FIG. 12 shows a block diagram illustrating an exemplary software architecture for modularizing artificial intelligence (AI) functions, according to aspects of the present disclosure.

Example Software Architecture for Video Compression and Decompression Using Deep Generative Models FIG. 12 is a block diagram illustrating an exemplary software architecture 1200 that may modularize artificial intelligence (AI) functions. Using architecture 1200, applications may be designed that may cause various processing blocks of an SOC 1220 (for example a CPU 1222, a DSP 1224, a GPU 1226, and/or an NPU 1228) to support video compression and/or decompression using deep generative models, according to aspects of the present disclosure.

The AI application 1202 may be configured to call functions defined in a user space 1204 that may, for example, compress and/or decompress video signals (or encoded versions thereof) using deep generative models and adaptively compress and/or decompress video signals based on the content included in a video signal.

A run-time engine 1208, which may be compiled code of a runtime framework, may be further accessible to the AI application 1202. The AI application 1202 may cause the run-time engine, for example, to request an inference at a particular time interval or triggered by an event detected by the user interface of the application. When caused to provide an inference response, the run-time engine may in turn send a signal to an operating system in an operating system (OS) space 1210, such as a Linux Kernel 1212, running on the SOC 1220. The operating system, in turn, may cause video compression and/or decompression using deep generative models to be performed on the CPU 1222, the DSP 1224, the GPU 1226, the NPU 1228, or some combination thereof. The CPU 1222 may be accessed directly by the operating system, and other processing blocks may be accessed through a driver, such as a driver 1214, 1216, or 1218 for, respectively, the DSP 1224, the GPU 1226, or the NPU 1228. In the exemplary example, the deep neural network may be configured to run on a combination of processing blocks, such as the CPU 1222, the DSP 1224, and the GPU 1226, or may be run on the NPU 1228.

The various illustrative circuits described in connection with aspects described herein may be implemented in or with an integrated circuit (IC), such as a processor, a digital signal processor (DSP), an application-specific integrated circuit (ASIC), a field-programmable gate array (FPGA), or other programmable logic device. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is also noted that the operational steps described in any of the exemplary aspects herein are described to provide examples. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The present disclosure is provided to enable any person skilled in the art to make or use aspects of the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

The invention claimed is:

1. A method for compressing video, comprising:
receiving video content for compression;
encoding the received video content into a latent code space through an encoder implemented by a first artificial neural network, the encoding being based, at least in part, on semantic information about content included in the received video content, wherein the semantic information partitions the received video content into foreground content and background content and identifies an amount of lossy compression to use in compressing the foreground content and the background content;
generating a compressed version of the encoded video content through a probabilistic model implemented by a second artificial neural network; and
outputting the compressed version of the encoded video content for transmission.

2. The method of claim 1, wherein the semantic information about the received video content comprises a content mask identifying an amount of lossy compression to use in compressing different areas of the received video content.

3. The method of claim 2, wherein the content mask comprises a binary mask trained by identifying foreground and background content in a plurality of training videos.

4. The method of claim 3, wherein encoding the received video content into the latent code space comprises:
quantizing foreground content using a first amount of compression loss; and
quantizing background content using a second amount of compression loss, wherein the first amount of compression loss is less than the second amount of compression loss.

5. The method of claim 2, wherein the content mask is trained to recognize foreground and background content using a recurrent convolutional neural network.

6. The method of claim 1, wherein the semantic information about the received video content comprises data from a fixed environment from which the video content was captured.

7. The method of claim 6, wherein:
the received video content comprises a plurality of video clips captured within the fixed environment, and
encoding the received video content into the latent code space comprises encoding fixed content in the plurality of video clips to a same code in the latent code space.

8. The method of claim 7, wherein the plurality of video clips captured within the fixed environment comprises video clips of a fixed ambient scene captured by a camera located in a fixed location.

9. The method of claim 7, wherein the plurality of video clips captured within the fixed environment comprises video clips captured from a fixed vantage point on a moving platform.

10. The method of claim 1, wherein:
the video content comprises a plurality of channels,
the plurality of channels comprise one or more additional data channels in addition to one or more luminance channels in video content captured by a first camera, and
the semantic information about the received video content comprises correlations between modalities in the plurality of channels.

11. The method of claim 10, wherein the one or more additional data channels comprise one or more color channels and a depth information channel.

12. The method of claim 10, wherein the one or more additional data channels comprise one or more channels capturing data within a range of visible wavelengths and one or more channels capturing data outside of the range of visible wavelengths.

13. The method of claim 10, wherein the video content comprises videos captured of a subject from different perspectives, wherein the videos are captured by the first camera and one or more second cameras.

14. The method of claim 1, wherein the probabilistic model comprises an auto-regressive model of a probability distribution over four-dimensional tensors, the probability distribution illustrating a likelihood that different codes can be used to compress the encoded video content.

15. The method of claim 14, wherein the probabilistic model generates data based on a four-dimensional tensor, wherein dimensions of the four-dimensional tensor comprise time, a channel, and spatial dimensions of the received video content.

16. A method for decompressing video, comprising:
receiving a compressed version of an encoded video content, the encoded video content having been encoded based, at least in part, on semantic information about content included in the received video content, wherein the semantic information partitions the received video content into foreground content and background content and identifies an amount of lossy compression used in compressing the foreground content and the background content;
decompressing the compressed version of the encoded video content into a code in a latent code space through a probabilistic model implemented by a first artificial neural network;
decompressing the code in the latent code space into a reconstruction of the encoded video content through a decoder implemented by a second artificial neural network; and
outputting the reconstruction of the encoded video content.

17. The method of claim 16, wherein the semantic information about the source video content comprises a content mask identifying an amount of lossy compression used in compressing different areas of the source video content.

18. The method of claim 17, wherein the reconstruction of the encoded video content comprises foreground content reconstructed with a first amount of compression loss and background content reconstructed with a second amount of compression loss, wherein the first amount of compression loss is less than the second amount of compression loss.

19. The method of claim 16, wherein the semantic information about the source video content comprises data from a fixed environment from which the video content was captured.

20. The method of claim 19, wherein the encoded video content comprises a plurality of video clips captured within the fixed environment such that fixed content in the plurality of video clips is encoded to a same code in the latent code space.

21. The method of claim 20, wherein the plurality of video clips captured within the fixed environment comprise video clips of a fixed ambient scene captured by a camera located in a fixed location.

22. The method of claim 20, wherein the plurality of video clips captured within the fixed environment comprise video clips captured from a fixed vantage point on a moving platform.

23. The method of claim 16, wherein:
the video content comprises a plurality of channels;
the plurality of channels comprise one or more additional data channels in addition to one or more luminance channels in video content captured by a first camera; and
the semantic information about the source video content comprises correlations between modalities in the plurality of channels.

24. The method of claim 23, wherein the one or more additional channels comprise one or more color channels and a depth information channel.

25. The method of claim 23, wherein the one or more additional channels comprise one or more channels capturing data within a range of visible wavelengths and one or more channels capturing data outside of the range of visible wavelengths.

26. The method of claim 23, wherein the video content comprises videos captured of a subject from different perspectives by the first camera and one or more additional cameras.

27. The method of claim 16, wherein the probabilistic model comprises an auto-regressive model of a probability distribution over four-dimensional tensors, the probability distribution illustrating a likelihood that different codes can be used to decompress the compressed version of the encoded video content into the code in the latent space.

28. The method of claim 27, wherein dimensions of the four-dimensional tensor comprise time, a channel, and spatial dimensions of the video content.

29. A system for compressing video, comprising:
at least one processor configured to:
receive video content for compression,
encode the received video content into a latent code space through an encoder implemented by a first artificial neural network, the encoding being based, at least in part, on semantic information about content included in the received video content, wherein the semantic information partitions the received video content into foreground content and background content and identifies an amount of lossy compression to use in compressing the foreground content and the background content,
generate a compressed version of the encoded video content through a probabilistic model implemented by a second artificial neural network, and
output the compressed version of the encoded video content for transmission; and
a memory coupled to the at least one processor.

30. A system for decompressing video, comprising:
at least one processor configured to:
receive a compressed version of an encoded video content, the encoded video content having been encoded based, at least in part, on semantic information about content included in the received video content, wherein the semantic information partitions the received video content into foreground content and background content and identifies an amount of lossy compression used in compressing the foreground content and the background content,
decompress the compressed version of the encoded video content into a code in a latent code space through a probabilistic model implemented by a first artificial neural network,
decompress the code in the latent code space into a reconstruction of the encoded video content through a decoder implemented by a second artificial neural network, and
output the reconstruction of the encoded video content; and
a memory coupled to the at least one processor.

* * * * *